US011419177B2

United States Patent
Velev et al.

(10) Patent No.: US 11,419,177 B2
(45) Date of Patent: Aug. 16, 2022

(54) METHOD, SESSION MANAGEMENT FUNCTION NODE, USER PLANE FUNCTION NODE, AND USER EQUIPMENT FOR SESSION MANAGEMENT PARAMETERS MAINTENANCE AND COMPUTER READABLE RECORDING MEDIUM THEREIN

(71) Applicant: NEC Corporation, Tokyo (JP)

(72) Inventors: Genadi Velev, Heidelberg (DE); Andreas Kunz, Heidelberg (DE); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/324,187

(22) PCT Filed: Oct. 11, 2017

(86) PCT No.: PCT/JP2017/036858
§ 371 (c)(1),
(2) Date: Feb. 8, 2019

(87) PCT Pub. No.: WO2018/070436
PCT Pub. Date: Apr. 19, 2018

(65) Prior Publication Data
US 2019/0174573 A1    Jun. 6, 2019

(30) Foreign Application Priority Data
Oct. 11, 2016    (EP) .................................... 16193391

(51) Int. Cl.
*H04W 76/10*    (2018.01)
*H04W 4/00*    (2018.01)
*H04W 76/38*    (2018.01)
*H04W 76/12*    (2018.01)
(Continued)

(52) U.S. Cl.
CPC ......... *H04W 76/38* (2018.02); *H04L 12/1407* (2013.01); *H04M 15/66* (2013.01);
(Continued)

(58) Field of Classification Search
CPC ........... H04W 72/042; H04W 36/0055; H04W 36/14; H04W 4/14; H04W 60/04;
(Continued)

(56) References Cited

U.S. PATENT DOCUMENTS 8,041,335 B2 *  10/2011  Khetawat ............... H04W 76/12
                                                    455/404.2
8,619,757 B2 *  12/2013  Shaheen ................ H04W 92/02
                                                    370/352
(Continued)

FOREIGN PATENT DOCUMENTS

WO    2018/034337    2/2018

OTHER PUBLICATIONS

International Search Report dated Feb. 1, 2018, in corresponding PCT International Application.
(Continued)

*Primary Examiner* — Sai Aung

(57) ABSTRACT

The method proposes to establish at least one session between the User Equipment and the Session Management Function node, and initiate session deactivation for a session indicated by the User Plane Function node, upon detection inactivity of User Plane connection for the session for a period by the User Plane Function node.

9 Claims, 14 Drawing Sheets

(51) Int. Cl.
*H04L 12/14* (2006.01)
*H04M 15/00* (2006.01)
*H04W 80/10* (2009.01)
*H04L 67/143* (2022.01)

(52) U.S. Cl.
CPC ........... *H04W 76/12* (2018.02); *H04W 80/10* (2013.01); *H04L 67/143* (2013.01)

(58) Field of Classification Search
CPC ..... H04W 76/38; H04W 88/16; H04W 48/18; H04W 72/04; H04W 76/12; H04W 76/27; H04W 12/0608; H04W 36/0011; H04W 36/0066
See application file for complete search history.

(56) References Cited

U.S. PATENT DOCUMENTS

| | | | |
|---|---|---|---|
| 2009/0270099 A1* | 10/2009 | Gallagher | H04W 8/08 455/435.1 |
| 2011/0134774 A1* | 6/2011 | Pelletier | H04L 5/001 370/252 |
| 2011/0243106 A1* | 10/2011 | Hsu | H04W 72/1284 370/336 |
| 2012/0020393 A1 | 1/2012 | Patil et al. | |
| 2012/0275401 A1 | 11/2012 | Sun | |
| 2013/0039294 A1* | 2/2013 | Wang | H04W 74/0833 370/329 |
| 2014/0016614 A1* | 1/2014 | Velev | H04W 36/14 370/331 |
| 2016/0338027 A1* | 11/2016 | Sun | H04W 72/04 |
| 2018/0227807 A1* | 8/2018 | Youn | H04W 36/38 |
| 2020/0053685 A1* | 2/2020 | Chandramouli | H04W 48/02 |
| 2020/0059989 A1* | 2/2020 | Velev | H04W 36/12 |

OTHER PUBLICATIONS

3GPP TR 23.799 V1.0.2 (Sep. 2016), "3rd Generation Partnership Project; Technical Specification Group Services and System Aspects; Study on Architecture for Next Generation System, (Release 14)", pp. 1-423, (Sep. 2016).
3GPP TS 23.401 V14.1.0 (Sep. 2016), "3rd Generation Partnership Project; Technical Specification Group Services and System Aspects; General Packet Radio Service (GPRS) Enhancements for Evolved Universal Terrestrial Radio Access Network (E-UTRAN) Access" (Release 14), pp. 1-378, (Sep. 2016).
Catt, "Solution of key issue 4 Session deactivation Procedure", SA WG2 Meeting #114, S2-161705, pp. 1-4, (Apr. 2016).
Samsung et al., "23.502 CN-Initiated PDU Session Deactivation Procedure", SA WG2 Meeting #121, S2-173263, pp. 1-3, (May 2017).
Office Action, dated Mar. 31, 2020, issued by the Japanese Patent Office in counterpart Japanese Patent Application No. 2019-519017.
Samsung; "Update to Solution 5.3: Re-Selection of User-Plane Path Based on UE Traffic Pattern", SA WG2 Meeting #116, S2-163298, pp. 1-3 (Jul. 2016).
Ericsson; "Security Solution for Infrequent Small Data", 3GPP TSG SA WG3, S3-161408, pp. 1-8 (Sep. 2016).
NEC Corporation; "Session Management Per PDU Session", SA WG2 Meeting #116bis, S2-165250, pp. 1-6 (Aug. 2016).
EP Office Action for EP Application No. EP17794435.2 dated Dec. 2, 2020.
Japanese Office Action for JP Application No. 2020-073352 dated Aug. 31, 2021 with English Translation.
Samsung, "Session maintenance procedures", 3GPP TSG-SA WG2#116, S2-163577, 3GPP, Jul. 5, 2016, Austria.
ZTE Corporation, CATR, "Session Management model with UL-CL in RAN", 3GPP TSG-SA WG2#116, S2-163253, 3GPP, Jul. 5, 2016, Austria.
Huawei, HiSilicon, "On-demand Asynchronous Session Management model", 3GPP TSG-SA WG2#116bis, S2-164630, 3GPP, Aug. 23, 2016, China.
Chinese Office Action for CN Application No. 201780063070.3 dated Jun. 21, 2022 with English Translation.

\* cited by examiner

Example architecture for multiple sessions and sessions with multiple GWs for the same data network Assumed architecture showing for a single slices/PDU sessions General block diagram for UE 20

General block diagram for MMF 24

General block diagram for SMF 26/27

General block diagram for (R)AN node 22

METHOD, SESSION MANAGEMENT FUNCTION NODE, USER PLANE FUNCTION NODE, AND USER EQUIPMENT FOR SESSION MANAGEMENT PARAMETERS MAINTENANCE AND COMPUTER READABLE RECORDING MEDIUM THEREIN

CROSS-REFERENCE TO RELATED PATENT APPLICATIONS

This application is a National Stage Entry of International Application No. PCT/JP2017/036858, filed Oct. 11, 2017, which claims priority from European Patent Application No. 16193391.6, filed Oct. 11, 2016. The entire contents of the above-referenced applications are expressly incorporated herein by reference.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to the so-called 'Next Generation' systems.

BACKGROUND ART

General

The following terminologies are used within this document and can be applied to any generation of mobile networks like 2G (GSM (Global System for Mobile communications)), 3G (UMTS (Universal Mobile Telecommunications System)), 4G (LTE (Long Term Evolution)/EPC (Evolved Packet Core)), 5G (NR (New Radio)/NextGen (Next Generation)) or any other. Taking an example, if "UE" is mentioned in the specification, it can be any generation of UE.

The term UDM (Next Generation User Data Management), SDM (Subscriber Database Management) or AAA (Authentication Authorization Accounting) could be used synonymously to HSS (Home Subscriber Server)/HLR (Home Location Register) from 3G/4G. Such functional entities act as a repository where the UE's subscription data is stored and can be compared to an existing HSS or HLR or a combined entity.

Functional entities or network function used in this document as separate entities could be also collocated together or even finer separated in particular deployments or as described in the architecture figures.

The terms 'terminal', or 'device', or 'user terminal' or 'UE' (User Equipment) or 'MT' (Mobile Terminal) are used in an inter-exchangeable manner where all of the terms express the similarly the equipment used to send/receive data and signaling from the network or mobile network or radio access network.

The term "session" is used in the same meaning as "PDU (Protocol Data Unit) session" or "PDN (Packet Data Network) connection" or "APN (Access Point Name) connection" or "connection for a particular network slice". The existing sessions are those sessions for which already a UE context exists (is established) in the core network control plane and/or user plane and the UE itself. The "existing sessions" has the same meaning as "established PDU sessions" or "established PDN connections". Each session can be identified with a "session ID (Identifier)", which can be similar to an "EPS (Evolved Packet System) bearer ID", an "APN", a "slice ID", a "slice instance ID", a "service ID" or any other temporary or permanent identifier of a PDN connection or a PDU session or a service used by the UE.

The term "connection" is used for the user plane connection where a kind of "path" is established to send the UL (Uplink) or the DL (Downlink) data between the UE and a user plane GW (Gateway) terminating the PDU session. Depending on the context, a connection can be either the whole user plane path for a PDU session; or only a connection over a given interface, e.g. a connection over a radio interface, or a connection over the NG3 interface (between a UPF (User Plane Function) in the NG CN (Next Generation Core Network) and the (R)AN ((Radio) Access Network)).

The following terminology for the procedures is used:

Session establishment: e.g. PDU session establishment where the SM (Session Management) context exists (is established) in the UE and in the NG CN control plane and/or user plane.

Session release: deletion of the PDU session, which means the SM context is deleted (released) in the UE and in the NG CN control plane and/or user plane.

Session/connection activation: activating the UP connection path for session, for which the SM context exists in the UE and in the NG CN.

Session/connection deactivation: deactivating the UP connection path without deleting the SM context in the UE and in the NG CN. With other words just releasing the UP connection.

The mobility states of the UE are called De-Registered, Registered-Standby ("Standby" for simplicity) and Registered-Ready ("Ready" for simplicity). These states are also called MM (Mobility Management) states. Please note that there is a difference between the mobility states (MM states) and session states (SM states).

Background

The telecommunication industry started to work on new generation of network referred as 5th generation (5G) networks. Activities in multiple research and standardization organizations were initiated to develop the 5G network which shall offer services to multiple vertical service providers and serving high variety of terminals. Especially 3GPP in activities were initiated in the RAN area under the term "New Radio" (NR) and in the core network (CN) under the term "NextGen" (NG). Please note that those terms will most probably change before the 5G system is introduced to the market. Therefore terms like NG CN (or alternatively NG AN) as used in this document have the meaning of any 5G CN or 5G AN technologies.

3GPP studies the NG system architecture, and corresponding issues and solutions are captured in 3GPP Technical Report (TR) 23.799 [1]. FIG. 1 describes the NG architecture for simultaneous access to multiple PDN connections (called PDU sessions in the NG study), as agreed in [1] by the time of writing. The upper part of the FIG. 1 shows an example for the NG control plane (NG CN) including a subscriber database management (SDM) 34, a Policy Control function (PCF) 32 and Core Control functions (CCFs) 24. The NG CCF 24 includes among others a mobility management function (MMF) and a session management function (SMF). The user plane (UP) function(s) are shows as a Core User plane function (NG UPF) 28/29, as there could be one or multiple UPFs per PDU session configured. Further information about the description of the interfaces and the network functions can be found in 3GPP TR 23.799 clause 7.3 [1].

One main feature of a 5G system is called network slicing. The 5G use cases demand very diverse and sometimes extreme requirements. The current architecture utilizes a relatively monolithic network and transport framework. Thus, it is anticipated that the current architecture is not flexible and scalable enough to efficiently support a wider range of business needs. To meet such needs, the 5G NG system can be "sliced" in multiple network instances which are referred as network slice instances (NSI). The network slices can be referred as logically separated networks where the resources (processing, storage and networking resources) for different network slices are isolated. A network operator uses a Network Slice Template/Blueprint to create a NSI. A NSI provides the network characteristics which are required by a Service Instance. One example of the network architecture allowing a UE to connect to multiple NSIs simultaneously is shown in FIG. 2, as described in [1].

FIG. 2 shows (using solid lines) a first network slice type/category (e.g. for IoT services) and (using discontinuous/broken lines) a second slice type (e.g. for broadband services). The first network slice type can have multiple NSIs for particular 3rd party customers. This figure shows that the RAN is shared and network slicing is applied in the NG CN. However, in future network slicing the RAN is also possible where the RAN resources are sliced/isolated, either in baseband processing or in frequency spectrum or both.

[1] also describes the Common Control Network Functions (CCNF) 24 and the Slice-specific Core Network Functions (SCNF) 23, as shown in detail in FIG. 3. The CCNF 24 may include fundamental control plane network functions to support basic functions' operation common among the NSIs, for example:

Subscriber Authenticator,
Mobility Management,
Network Slice Instance Selector (NSI Selector),
NAS Routing Function, etc.

In general, the NG system design should enable the transmission of any kind of data. It is assumed that the NG system supports the following PDU session types:

IP type (e.g. IPv4 or Ipv6 or both), or
non-IP session (any unstructured data) or
Ethernet type.

One further solution described in 3GPP TR 23.799 (in clause 6.4.3) is shown in FIG. 4. The UE 20 may establish multiple PDU Sessions to the same data network in order to satisfy different connectivity requirements of different applications (e.g. session continuity) that require connectivity to the same data network. In this solution, the MM and SM functions are separated.

With this, one main concept is that multiple SM contexts can be available per MM context. Also, different session continuity types per PDU session are possible.

SUMMARY OF INVENTION

Technical Problem

The scenario considered in this document is that a UE is attached to the network and can be associated with multiple UP-GWs (UPFs). The different UPFs can be (a) part of the same PDU session, or (b) part of different PDU sessions, or (c) part of different network slice instances (NSIs). With other words, multiple NG3 connections (e.g. tunnels over NG3 interface) between the (R)AN and the UPFs can be available.

One assumption in this document is that a UE's "session" (or also called a "PDN connection" or a "PDU session" to a particular data network) can be in the Idle (inactive) state or the Active (connected) state. In this sense the terms "Idle session" or "Active session" are used. If a session is in the "Idle" state, then there is no NG3 connection/tunnel established between the UPF and the (R)AN. If a session is in the "Active" state, then there is a NG3 connection/tunnel established between the UPF and the (R)AN. It is further assumed that for an established UE's session a Session Management Function (SMF) is instantiated/configured in the control plane and corresponding one or more UPFs are instantiated/configured in the user plane. Further details about the Idle and Active session state of the CPF (Control Plane Function) and the UPF can be found below in the detailed description.

As it is assumed that a single Session Management Function (SMF) is configured (or instantiated) per PDU connection or NSI and also the UE is registered for multiple sessions, there is need to isolate the session management due to the resource isolation per network slice. With this, the management of the session context needs to be isolated per session.

There are existing proposals of independent management of session states. However, it is unclear how to derive and configure the session parameters for the various PDU sessions, e.g. QoS (Quality of Service) parameters, or UE/Session Inactivity timer value(s) in the (R)AN node, which can be a part of the CN-assisted RAN parameters. Also, in case of flow based QoS framework (e.g. section 6.2.2 in TR 23.799) it is unclear which is the network function(s) in the control plane to generate and install the QoS policy to the user plane nodes.

Further, in case of multiple UPFs configured per PDU session (e.g. for local data network and for central data network as shown in FIG. 1), it is unclear how to activate multiple NG3 tunnels with different session parameters simultaneously.

The present disclosure seeks to solve or at least alleviate the above problems by reducing the required signaling for NG3 tunnel establishment allowing the activation of a particular session out of multiple existing sessions.

Solution of Problem

As one aspect of the present disclosure, a Session Management Function (SMF) node comprising: a processor configured to process to establish at least one session with a User Equipment (UE); and a receiver configured to receive, from a User Plane Function (UPF) node, information indicating inactivity of user data transfer for a session among the at least one session for a period, and wherein the processor is further configured to process to initiate session deactivation for the session indicated by the UPF node is provided.

As another aspect of the present disclosure, a User Plane Function (UPF) node comprising: a processor configured to detect inactivity of user data transfer for a session among at least one session between a User Equipment (UE) and a Session Management Function (SMF) node, for a period; and a transmitter configured to transmit, to the SMF node, information for deactivation of User Plane (UP) connection for the session based on detection of the inactivity is provided.

As another aspect of the present disclosure, a mobile communication system comprising the UPF node and the SMF node is provided.

As another aspect of the present disclosure, a session management method comprising: establishing at least one session with a User Equipment (UE); receiving, from a User Plane Function (UPF) node, information indicating inactivity of user data transfer for a session among the at least one session for a period, and wherein initiating session deactivation for the session indicated by the UPF node is provided.

As another aspect of the present disclosure, a User Equipment (UE) inactivity detecting method, comprising: detecting inactivity of user data transfer for a session among at least one session between a UE and a Session Management Function (SMF) node for a period; and transmitting, to the SMF node, a message for deactivation of User Plane (UP) connection for the session based on detection of the inactivity is provided.

As another aspect of the present disclosure, a non-transitory computer readable recording medium recording a program, the program, when executed by a processor of a computing device, causing the processor to execute a session management method comprising: establishing at least one session with a User Equipment (UE); and receiving, from a User Plane Function (UPF) node, information indicating inactivity of user data transfer for a session among the at least one session for a period; and initiating session deactivation for the session indicated by the UPF node is provided.

As another aspect of the present disclosure, A non-transitory computer readable recording medium recording a program, the program, when executed by a processor of a computing device, causing the processor to execute a User Equipment (UE) inactivity detecting method, comprising: detecting inactivity of user data transfer for a session among at least one session between a UE and a Session Management Function (SMF) node, for a period; and transmitting, to the SMF node, information for deactivation of User Plane (UP) connection for the session based on detection of the inactivity is provided.

DESCRIPTION OF EMBODIMENT

Figure 1:
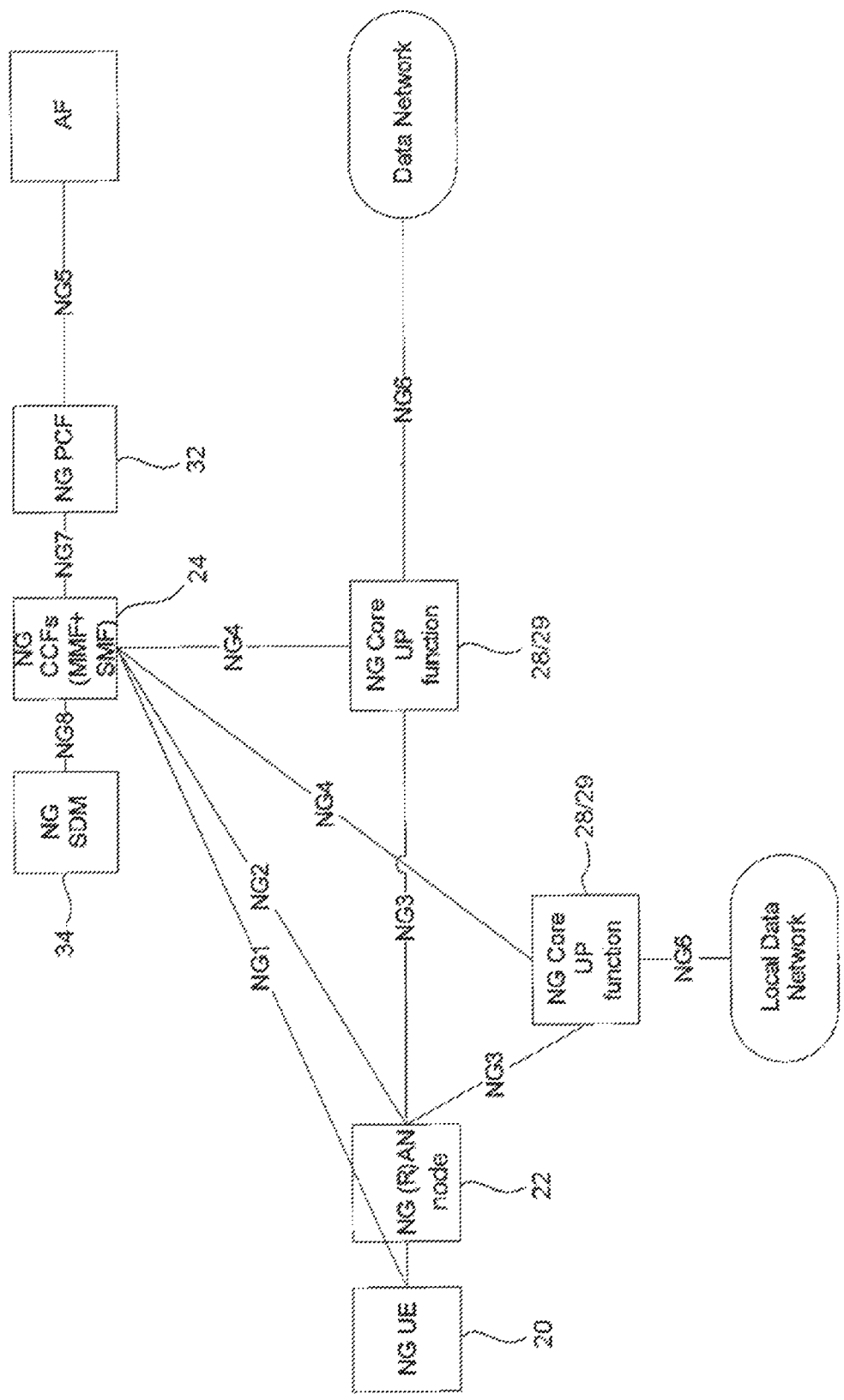
FIG. 1 is a diagram for illustrating example non-roaming reference architecture for access to multiple PDU/PDN sessions to local and central data networks.
Figure 2:
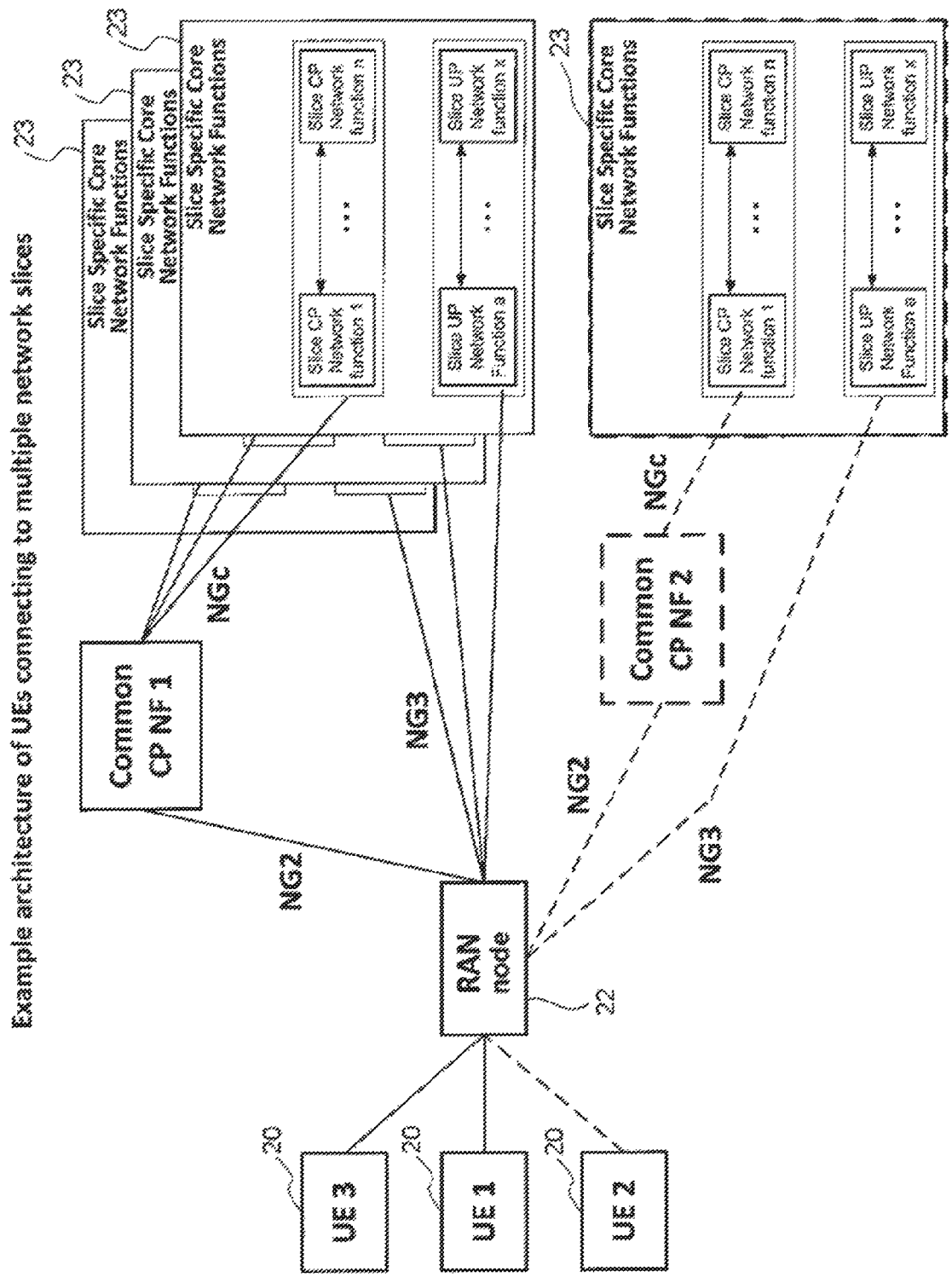
FIG. 2 is a diagram for illustrating example architecture of UEs connecting to multiple network slices.
Figure 3:
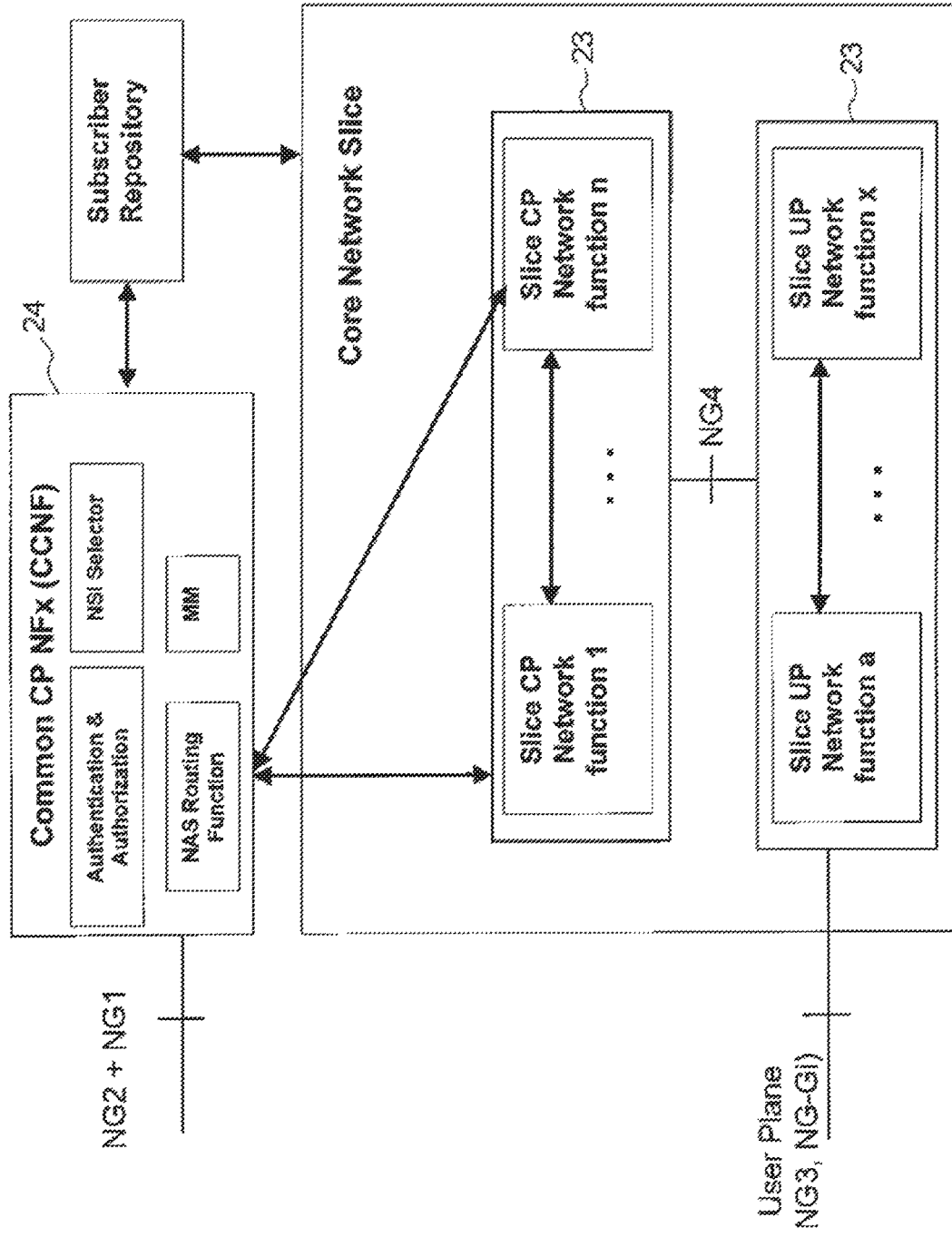
FIG. 3 is a diagram for illustrating example of common control plane part and slice specific part.
Figure 4:
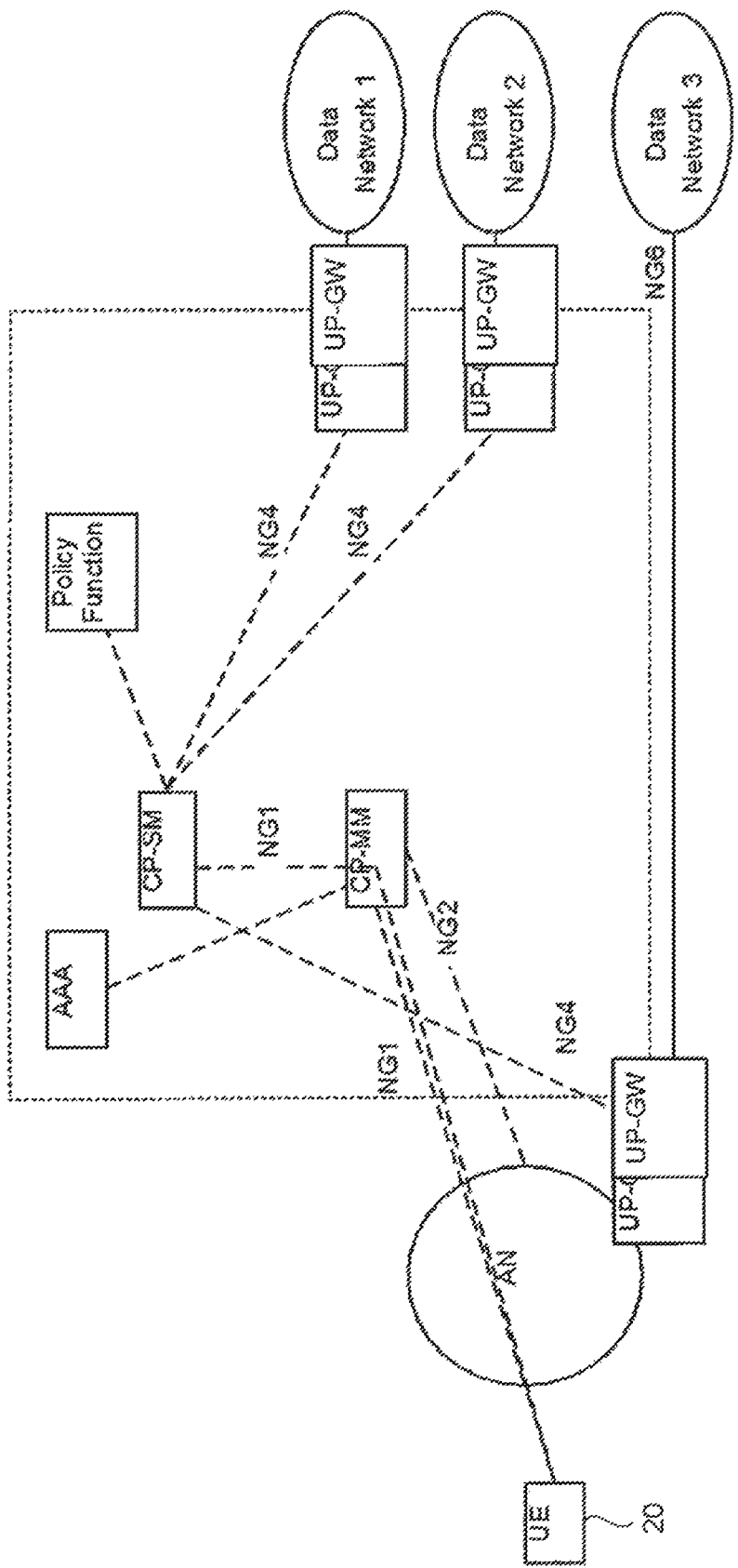
FIG. 4 is a diagram for illustrating example architecture for multiple sessions and sessions with multiple GWs for the same data network.
Figure 5:
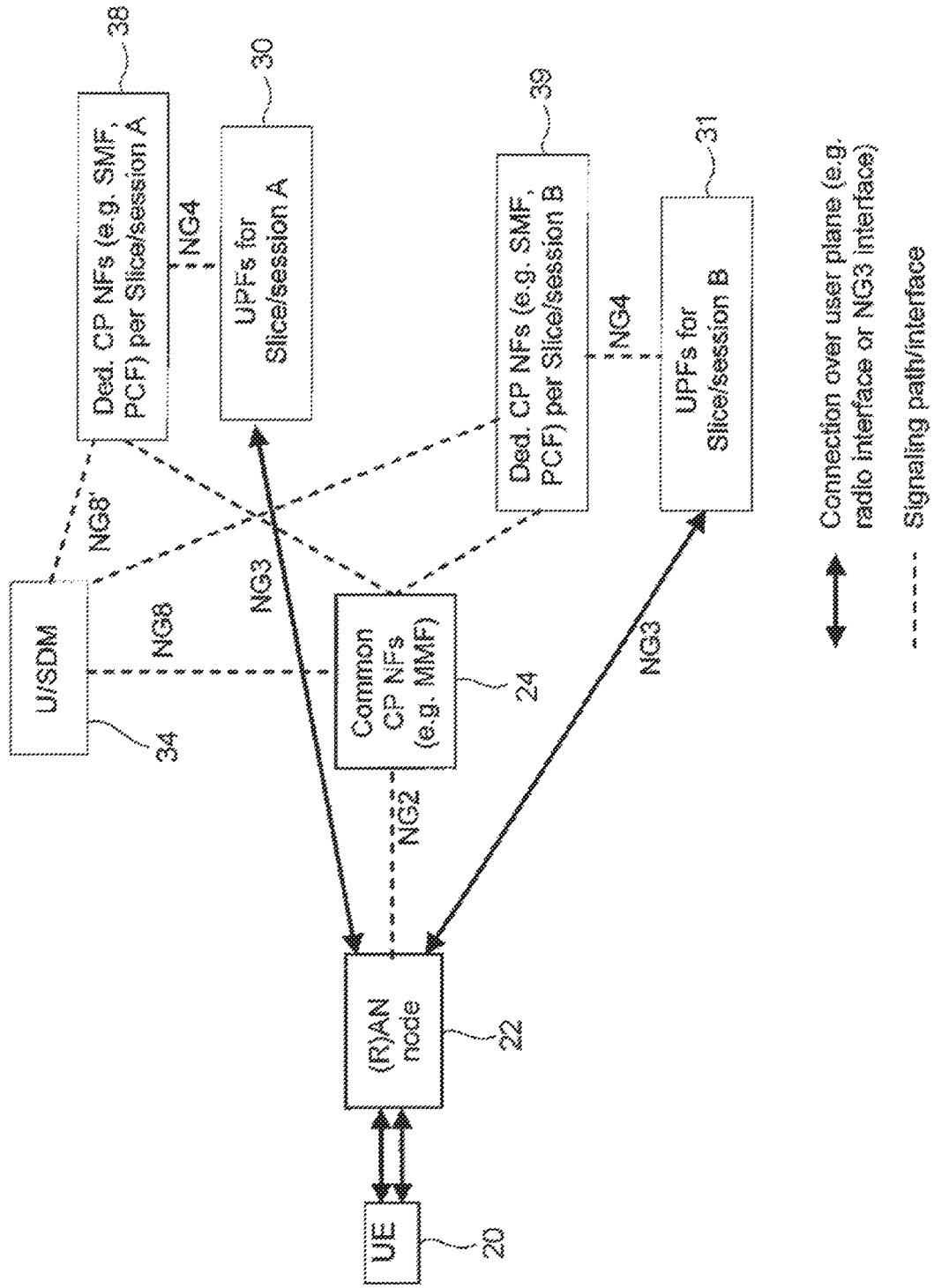
FIG. 5 is a diagram for illustrating assumed architecture showing multiple network slices/PDU sessions (with corresponding multiple dedicated CPFs).

For the purposes of this document the reference architecture from FIG. 1 for a single established session (a network slice or a PDU session) is assumed. For multiple established sessions, FIG. 5 is introduced as an exemplary architecture where a UE 20 has established 2 different sessions A and B. Please note that this is for exemplary purpose only and the number of sessions is not limited to two. The different sessions may belong to different network slices or to the same network slice but having multiple PDU sessions. In the control plane there is a box denoting common control network functions (CCNFs) 24 which are shared among network slices or PDU sessions. Such CCNFs 24 may include a mobility management NF (called MMF), an Authentication/Authorization/Security NF (network function), a NAS (Non-Access Stratum) signaling routing a NF and others. As it is shown in FIG. 5, each PDU session or network slice can have independent dedicated CPFs 38/39. The Dedicated CPFs 38/39 may include the following exemplary network functionality:

Session Management network function (SMF): it is assumed in this document that this function is responsible for the session management for a specific session (a network slice, or a PDU session).

CPF of a GW (aka GW-C of the UPF), as the CP (Control Plane) of the GW is known as S/PGW-CP (Serving/PDN (Packet Data Network) Gateway-Control Plane) function from the control/user plane separation in EPC, called CUPS).

PCF: the complete or part of the PCF as described in FIG. 1. This means that some parts of the PCF can be a part of the CCNF and other parts can be part of the Dedicated CPF.

Authentication, Authorization and Security functions related to the specific Network slice of the PDU session.

Each SMF has a signaling association with the UE's MMF. For each established session, the MMF and the SMF know each other and can send signaling at any time independent of the UE's mobility or session state. Further, the CCNF 24 and the SMF exchange a UE ID or a subscriber ID (temporary or permanent) and use this ID in each signaling message exchange in order to point to the corresponding UE's context in the CCNF 24 or in the SMF.

In addition, a UPF (3GPP specified GW functionality e.g. to enforce QoS or traffic policies) per network slice or PDU session is configured/instantiated. Each of the (NG3) connections A or B can be managed independent, i.e. can be established, modified or released independent from the other connections. Please note that there can be one or multiple UPFs. For example a UPF closer to the Edge can be used as a mobility anchor and a UPF deeper in the CN can be used as an IP anchor (hosting the UE's IP address). For simplicity, in this specification a single UPF is used. However, the SMF is able to configure multiple UPFs if multiple UPFs are needed and instantiated/configured for a given session.

One example shown in FIG. 5 is that there are 2 connections (e.g. tunnels over NG3) between a (R)AN node 22 and UPFs 30/31: a single connection for the slice/session A and the slice/session B. If tunneling over NG3 is used per UE between the AN node and the UPFs A 30 or B 31, then there will be 2 tunnels established/modified/released each time when the UE transfers among the Standby↔Ready mobility state. Even worse, if the tunneling over NG3 is per IP flow or per bearer then even more tunnels need to be established/modified/released for each Standby and Ready mobility state transition.

The dedicated CPFs 38/39 can include a SMF and a Policy Control function (PCF). It is noted that the existence of the PCF in the dedicated CPF may be based on the particular use case, e.g. for some network slices the PCF can be instantiated/configured per slice, whereas for other networks slices the PCF can be instantiated/configured as a common CP NF.

Solution 1

One main idea of this document is that the SMF maintains the PDU session parameters based on exchange with multiple other control plane core network entities. The "maintaining" of session parameters is assumed to include the actions like e.g. the SMF retrieves the subscription or other temporary user parameters from other CN CP NFs, the SMF derives new session parameters or parameter values, or the SMF dynamically modifies the values of the parameters and signals those parameters to the involved UP and/or CP NFs in the core network and the access network. The SMF also considers the UE's capabilities/preferences/information indicated by the UE in the NAS session management signaling request to the SMF. The PDU session parameters are derived by the SMF per session for all impacted (UP) NFs, i.e. if a UE has multiple sessions with different SMFs, then those SMFs create different sets of PDU session parameters based on the different session requirements.

The SMF provides the session parameters to the MMF at session (i.e. UP connection) activation for a particular PDU session. The MMF can use these session parameters to generate the UE context which is sent to the (R)AN node. For comparison purposes, in the 4G LTE/EPC the procedure for sending the UE context from a MME (Mobility Management Entity) to an eNB (evolved NodeB) is called "Initial Context Setup procedure" which also establishes the E-RAB (E-UTRAN (Evolved Universal Terrestrial Radio Access Network) Radio Access Bearer) context in the eNB. The difference to this document is that in this document the session context, which is a part of the whole UE context, for a particular UP connection (including the RAB (Radio Access Bearer) and the NG3 tunnel connection) comes from the SMF. With other words, the CCNF (e.g. the MMF) generates the UE context to be sent to the (R)AN node based on the indication and information (session context) sent from the SMF.

Figure 6:
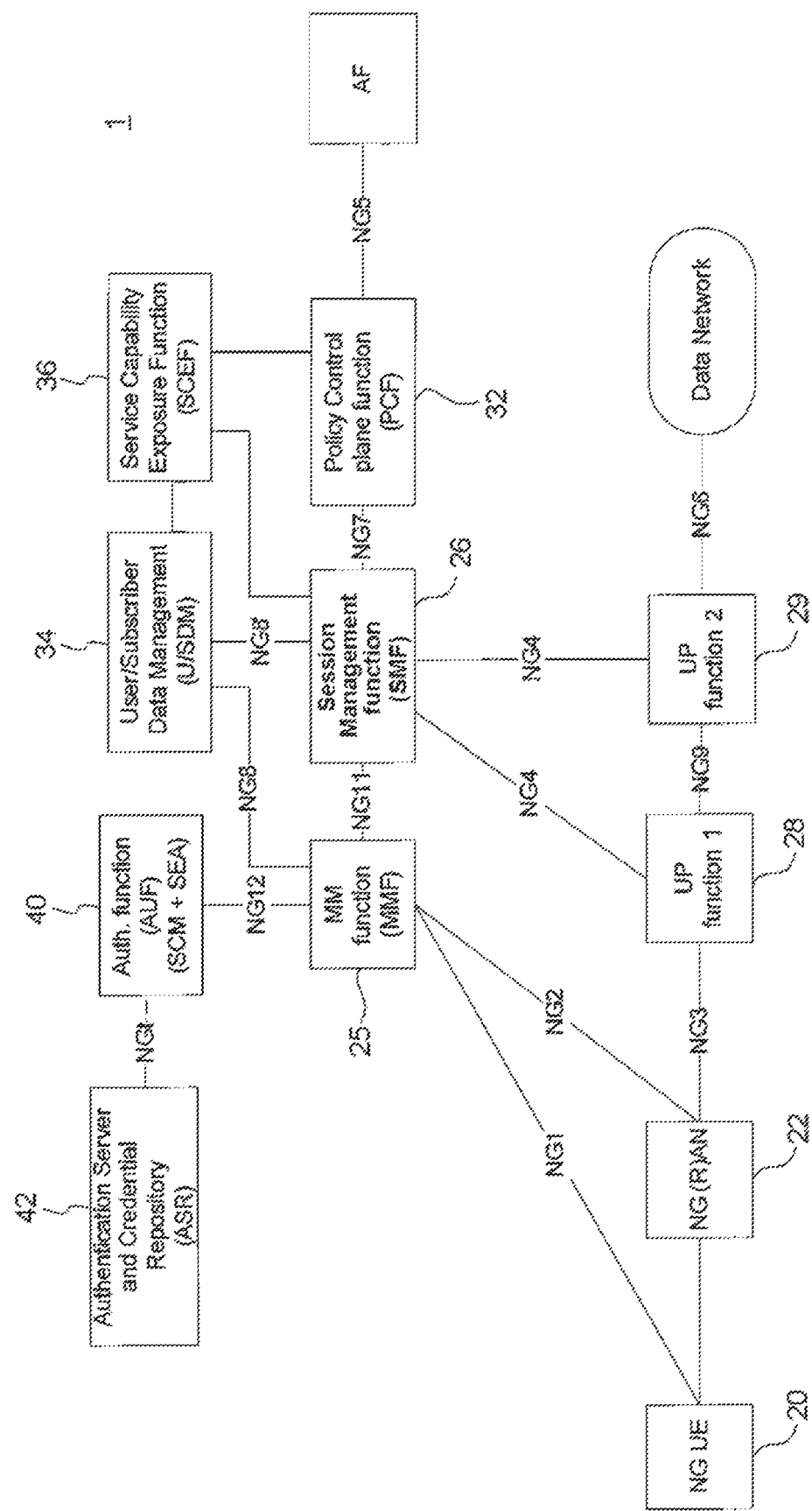
FIG. 6 is a diagram for illustrating assumed architecture showing for a single slices/PDU sessions.

FIG. 6 shows the assumed network architecture for a single PDU session where the common and the dedicated CP NFs are not separated explicitly and depicted as a whole system 1. The common NG CN NFs can be for example the MMF 25, the ASR (Authentication Server and Credential Repository) 42, (the SCM (Security Context Management)+ the SEA (Security Anchor Function)) 40, the U/SDM 34, and the SCEF (Service Capability Exposure Function) 36. The dedicated NG CN NFs can be the SMF 26, the UPF 28/29 and the PCF 32. It is possible that the CPF is also a common CN CP NF. According to the main idea above, the SMF 26 is a central network function to retrieve and derive the session parameters taking into account the subscription parameters (the U/SDM 34), policy rules (the PCF 32) and communication parameters from external entities (over the SCEF 36).

Figure 7:
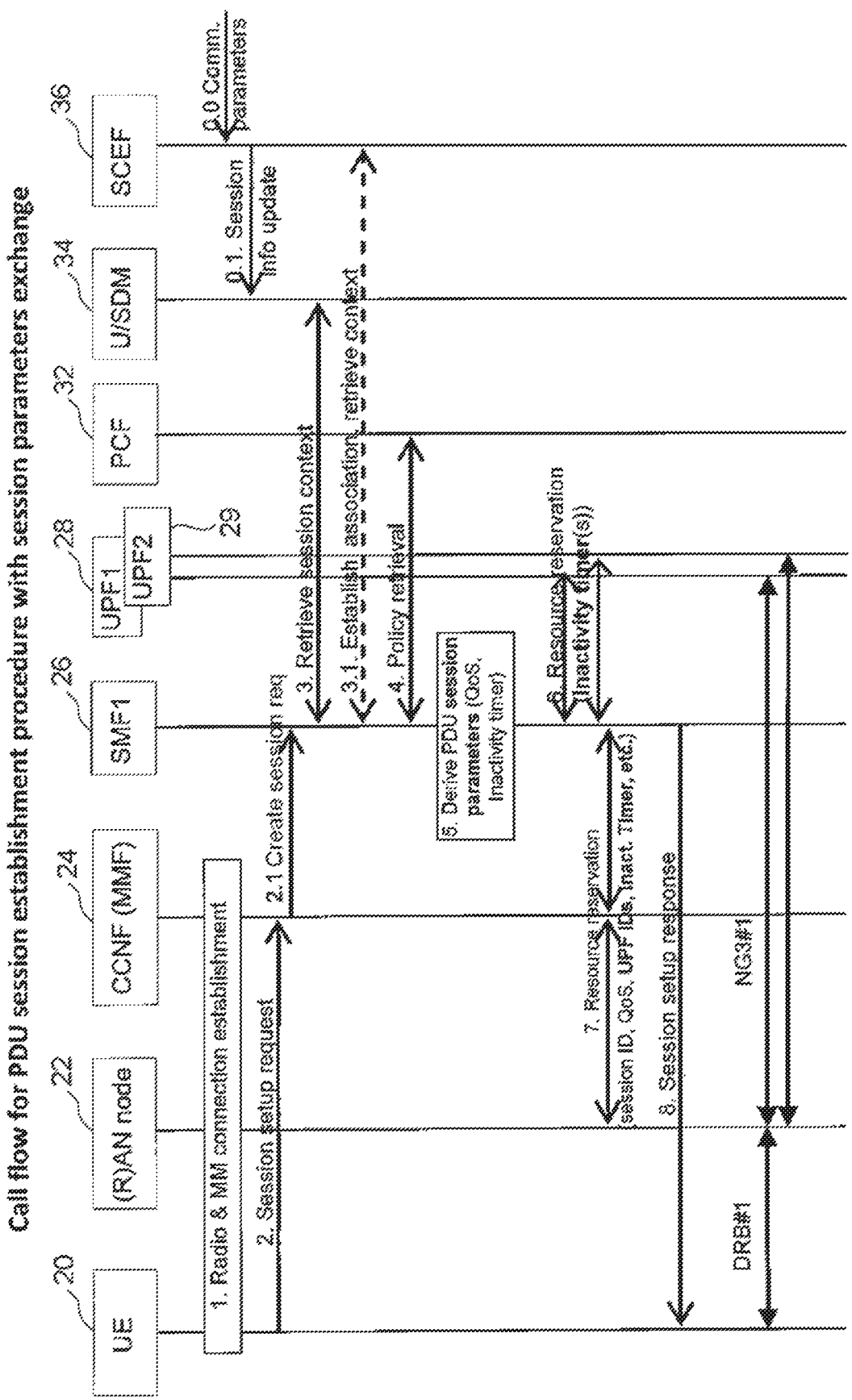
FIG. 7 is a diagram for illustrating call flow for the PDU session establishment procedure with session parameters exchange.

FIG. 7 shows a session establishment procedure. The main principles of the proposed solution are:

The SMF1 26 retrieves session (e.g. DNN (Data Network Name)/APN-related) subscription information or dynamically generated information from the U/SDM 34, the PCF 32 or the SCEF 36.

In case the SMF1 26 obtains information via the SCEF 36, the SMF1 26 and the SCEF 36 discover each other (if needed) and handshake during session establishment. In addition, the SMF1 26 considers the information received from the UE 20 (e.g. during a NAS SM request) and received from the CCNF 24 (e.g. the MMF) about UE capabilities or preferences.

The SMF1 26 derives or updates or modifies session parameters (e.g. QoS rules, charging rules, QoS parameters and/or multiple Inactivity timer(s)). The SMF1 26 can update or modify or newly determine session parameters at any time implicitly, i.e. without retrieval of new information from other CN CP NFs. The SMF1 26 coordinates and synchronizes the states of the different NFs per session, especially the inactive state transition.

For example, the SMF1 26 may store a communication pattern indicating the different UE behaviour or Application behaviour at various times in a given interval, e.g. day or week days.

The SMF1 26 may decide to derive a single or multiple UPFs for the PDU session based on the information received from the U/SDM 34, the PCF 32 or the SCEF 36.

The SMF1 26 sends currently valid session parameters to the (R)AN node 22 (via the MMF 24). The SMF1 26 may also install at each session Activation such Session parameters to the UPF 28/29 during session establishment, or send them to the UPF 28/29 each time at session/NG3 activation.

The steps from FIG. 7 are described in detail as follows:

Step (0): This is an optional step where the 3GPP external entities like a SCS/AS (Service Capability Server/Application Server) can indicate to the SCEF 36 particular communication characteristics of a UE 20 or for a specific Application. The communication between the SCS/AS and the SCEF 36, as well as the authentication of the exchange with the HSS (or the U/SDM 34) is described in 3GPP TS23.682. It is assumed that the SCEF 36 or alternatively the U/SDM 34 can store the received communication characteristics and can associate the communication characteristics with a particular session ID (e.g. an APN from the 3G/4G systems).

Step (1): The UE 20 initiates radio connection and NAS connection establishment procedures. Besides the usual parameters included by the UE 20 in the NAS MM message (e.g. the UE ID, capabilities, preferences, etc.) the UE 20 includes a new capability indication about the support (or non-support) of one-to-one mapping of radio connections (RAB/DRB (Data Radio Bearer)) and existing NAS Session management contexts. With other words, the UE 20 includes the new capability indication for indicating whether the UE 20 supports the feature of establishing e.g. a single RAB/DRB to a particular existing NAS SM context whereas multiple NAS SM contexts (for multiple PDU sessions). For example, a UE 20 implementing Release-13 LTE would expect that a RAB/DRB is established for each existing NAS ESM (EPS Session Management) context. However, a UE 20 implementing Rel-15/16 LTE or New Radio technology can support the feature of "independent Session UP activation" meaning that UP connections can be activated or deactivated per PDU session without deleting the NAS SM context. One example name of such new capability indication can be "individual SM activation" or "separate SM activation" if the UE 20 supports this feature. An example impact of this new UE's indication is shown in solution 3, FIG. 10.

Step (2): The UE 20 initiates a Session setup procedure, e.g. by sending a NAS Session setup request message to the NG CN. Such a message can be considered as a NAS session management (SM) message. Please note that the NAS Session setup request message may be encapsulated within the NAS MM message like e.g. an Attach request message (i.e. may not be a standalone message).

Although the NAS Session setup request message is sent from the UE 20 and is terminated at the SMF1 26, the message traverses (e.g. is forwarded over) a common NAS termination entity in the CCNF 24 (e.g. the MMF). The CCNF 24 can process the message (e.g. determine the destination SMF entity) and select a proper SMF1 26 where to forward the message. The CCNF 24 (e.g. the MMF or the NAS termination function) can include additional UE information towards the SMF1 26 to help the SMF1 26 to correctly process the NAS SM message (as exemplary shown in step 2.1). For example the CCNF 24 (MMF) can encapsulate or piggyback the NAS Session setup request message into another NG11 interface message which for exemplary purposes is shown as a Create Session request message in step 2.1. The Create Session request message contains, in addition to the NAS Session setup request, at least one or multiple of the following parameters: UE information like temporary or permanent subscriber IDs or device IDs (e.g. an IMSI (International Mobile Subscriber Identity), a TMSI (Temporary Mobile Subscriber Identity), a MSISDN (Mobile Subscriber Integrated Services Digital Network Number)), a signaling exchange reference ID, a PDU session or a bearer ID, etc. The NAS Session setup request message from the UE 20 contains information like PDU session type (e.g. IPv4, IPv6, non-IP or Ethernet, etc.) and the Session/Service continuity type(s) (e.g. type 1, type 2 and/or type 3) for this PDU session. The SMF1 26 uses this information to refer the signaling interaction with the MMF 24 and also uses the information for the signaling exchange with other CN CP/UP NFs.

Step (3): The SMF1 26 receives the request from the UE 20, validates the message and determines the corresponding NG CN NFs which can serve this UE's session. The SMF1 26 retrieves UE's session-related static or dynamic subscription context from the U/SDM 34. For this purpose the SMF1 26 is either pre-configured with the U/SDM address (or ID), or the SMF1 26 receives the U/SDM address (or ID) from the MMF 24, or the SMF1 26 discovers the U/SDM address (or ID) using e.g. DNS resolution. For the interaction with the SCEF 36, the U/SDM 34 and the SCEF 36 might have established an association with each other as described in (0.1). The U/SDM 34 may store the parameters/information received from the SCEF 36 in particular DNN/APN-related session subscription information.

It is possible that the (PDU) session-related subscription parameters from the U/SDM 34 contain information about an SCEF 36 associated with this PDU session. The SMF1 26 learns about (i) the SCEF identity and (ii) whether to contact the SCEF 36 directly or whether the communication exchange goes over the U/SDM 34. If needed, the SCEF 36 and SMF1 26 establish a direct association for the exchange and/or update of session parameters. For example the SMF1 26 initiates a Create connection request (or Association establishment) procedure as shown in step (3.1). This procedure can be similar to the T6a/T6b connection establishment procedure between the MME and the SCEF from TS23.682. The difference to the existing procedure in TS23.682 is that the SMF↔SCEF connection/association is established for a session update for a particular PDU session, whereas in the association is established for non-IP data transmission.

Step (4): If required (based on type of a PDU session and/or subscription information and/or local policies in the SMF1 26), the SMF1 26 selects a PCF 32 and retrieves policy rules and/or charging rules information for the PDU session. The policy rule information can be a dynamic rule or a pre-defined rule which is mapped in the SMF1 26 to e.g. known QoS/priority rules.

Step (5): Based on input from the subscription information and the policy rules, the SMF1 26 derives session parameters for the particular PDU session. An example about session parameters' details is listed below after the description of this call flow in NOTE 1. In addition the SMF1 26 selects the UPF(s) 28/29 to serve the PDU session. For example, the SMF1 26 can select a local UPF and a central UPF if the PDU session allows for both local and central traffic routing.

Step (6): The SMF1 26 performs a resource reservation procedure with the selected UPF(s) over the NG4 interface. This procedure can be similar to the Sx Session Establishment Procedure as described in TS23.214. The resource reservation procedure, or alternatively the Sx Session Establishment Procedure, is performed per UPF.

The SMF1 26 can determine one or multiple Inactivity timers to be applied to the UPF 28/29 for different purposes. These Inactivity timers, together with other parameters, are sent to the UPF1 28. Details about the Inactivity timer(s) installed in the UPF 28/29 can be found below in NOTE 2.

In addition, the SMF1 26 creates and sends to the UPF 28/29 the QoS policy (e.g. marking rules or filters) for the data packets. One particular example is the case of Flow based QoS architecture. Please see NOTE 3.

Step (7): After successful establishment of the UPF session over NG4 interface, the SMF1 26 initiates a resource reservation procedure with the (R)AN node 22. This procedure is performed over the CCNF 24 (e.g. the MMF). The SMF1 26 sends the session context parameters directly to the RAN node 22, however, the SMF1 26 may not necessarily know the RAN node destination ID. Thus, the SMF1 26 may direct the message in step (7) to the MMF 24 and the MMF 24 forwards the message (e.g. without changing the session context parameters) further to the RAN node 22. This message contains one or multiple of the following parameters: UE ID(s), Session ID(s), QoS parameters, UPF ID(s), Inactivity timer(s). Please see NOTE 1 below for a complete list of session parameters.

The SMF1 26 provides the session parameters info to the (R)AN node 22 over NG2 interface to indicate to the (R)AN node 22 how to manage the QoS policy (e.g. scheduling of differently marked packets) of the UP packets coming from the UPF(s) 28/29. Please see NOTE 3.

Step (8): After the successful resource reservation procedure with the (R)AN node 22, the SMF1 26 replies to step (2) to the UE 20 with a Session setup response message. The Session setup response message can be referred as a NAS SM message and the Session setup response message contains some session parameters (e.g. QoS parameters) to be used by the UE 20 in the uplink communication.

After step (8), the radio access connection/bearer and the NG3 connection/tunnel are established and the UL and DL packets can be transmitted.

NOTE 1: An example list of session (context) parameters maintained at the SMF is shown below. Please note that this list is non-exhaustive and not limited to the mentioned parameters as list of parameters, but as well as names:

(1) UE identifiers (temporary or permanent, optionally including subscriber identifiers) and session identifier(s);

(2) Traffic/packet/flow/service priority (or multiple priorities);

(3) The flow/service level (i.e., per service data flow, SDF (Service Data Flow), or per SDF aggregate), and QoS parameters includes the QCI (QoS class identifier), the ARP (allocation and retention priority), the GBR (guaranteed bit rate), and the MBR (maximum bit rate). These parameters may include some of the parameters listed in other bullets in this bulleted list.

(4) Packet Delay;

(5) Data rates valid for the whole PDU session (which can be similar, same or different from bullet (3)): AMBR (aggregate maximum bit rate). A new proposed parameter is to have an AMBR per configured/used UPF. In case of multiple UPFs, the SMF may determine an AMBR per UPF, and the SMF can assign the value to each UPF;

(6) Communication pattern for the application(s) using this PDU session=>e.g. Session Inactivity timer (for the Idle state), RAN Inactivity/Dormant timer (for the RAN Inactive/Dormant state), one or more types of UPF Inactivity timers;

(7) One or multiple UPF IDs (an IP address, a tunnel endpoint ID, etc.); and (8) etc.

NOTE 2: The SMF can generate different types of CN UP Inactivity timers used for different purposes:

One type can be the Inactivity timer for the deactivation of the UP connection (deactivation of PDU session), but still keeping the PDU session context in the UE and the NG CN NFs (e.g. the SMF and/or the UPF). Such first type of the Inactivity timer can be exemplary called "UP Inactivity timer" meaning to trigger the UP connection deactivation. Once the UP Inactivity timer expires in the UPFs, then the UPF triggers the SMF to deactivate the UP connection, i.e. to deactivate the (R)AN access connection and the NG3 tunnel/connection. The session parameters/context is kept in the UE and the NG CN NFs (e.g. the SMF, and/or the UPF).

Another type of the Inactivity timer can be to release the PDU session, which would mean the release of the PDU session context in the UE and the NG CN NFs (e.g. the SMF and/or the UPF). Such second type of the inactivity timer can be exemplary called "Session Inactivity timer", meaning to trigger the complete session release. Once the Session Inactivity timer expires in the UPFs, then the session is terminated and the context is removed, as well as the packet flow/bearer filters on the NG3, the NG6 and the NG9 reference points. The UPF trigger the SMF to release the PDU session including all SM states in the UE and other (R)AN nodes and NG CN NFs.

Please note that the configuration of any session context parameters, and in particular "Session Inactivity timer", "RAN Inactivity/Dormant timer", "UP Inactivity timer", or "Session Inactivity timer" by the SMF1 26 can be also based on information received from an Application server or a service platform (e.g. the SCS/AS) over the SCEF 36. The SMF1 26 matches the information received from an SCEF 36 to a particular PDU session context based on a UE ID and/or a session ID like DNN or APN as during step (4) in FIG. 7.

The SMF synchronizes and manages the SM states in the UE, the UPFs and the (R)AN nodes. Wherever the SMF recognizes a mismatch, e.g. one NF has a timing mismatch and does not send the deactivation request in time to the SMF. When the UE is getting in active mode gain for this session, the CCNF assigns a new SMF and the procedure is performed as described above. The SMF may select other UPFs, e.g. based on current load situation.

It is possible to group the above session parameters per UPF. For example, if a PDU session is configured with 2 UPFs 28/29 as shown in FIG. 1, the SMF can generate a session parameters set per UPF, in this case, 2 session parameters sets for the UPF1 28 and the UPF2 29. The signaling message from the SMF towards the (R)AN node 22 over the MMF needs to implement a corresponding structure and identifiers, so that the (R)AN node 22 applies the session parameters correctly per UPF. This would result in modified signaling messages in step (7) in FIG. 7. For example, the structure of the signaling message can be like:

Resource reservation request (e.g. towards the RAN node 22)
a Session ID
the UPF ID #1
  info for NG3 tunnel establishment, e.g. an IP address, a tunneling endpoint ID and/or a transport layer port ID
  [List of session parameters as described in NOTE 1]. Please note that any parameter from the list can be used or combined with others.
  Traffic/flow filter rules to be applied at the (R)AN node, e.g. how does the (R)AN node decide which the UL traffic to send over the NG3 tunnel to the UPF ID #1.
  (optionally) UE's support of "individual SM activation" (this is needed in cases that such indication is not transmitted directly from the UE to the (R)AN node, e.g. in the RRC signaling, or not transmitted from the CCNF (e.g. the MMF) to the (R)AN node over the NG2 interface as part of the UE context setup procedure).
  Etc.
the UPF ID #2
  info for NG3 tunnel establishment, e.g. an IP address, a tunneling endpoint ID and/or a transport layer port ID
  [List of session parameters as described in NOTE 1].
  Traffic/flow filter rules to be applied at the (R)AN node, e.g. how does the (R)AN node decide which the UL traffic to send over the NG3 tunnel to the UPF ID #1.
  (optionally) UE's support of "individual SM activation" (this is needed in cases that such indication is not transmitted directly from the UE to the (R)AN node, e.g. in the RRC signaling, or not transmitted from the CCNF (e.g. the MMF) to the (R)AN node over the NG2 interface as part of the UE context setup procedure).
  Etc.

Please note that the above parameters are applied in case of having a single (radio) access connection, e.g. a single RAB or DRB, and multiple NG3 connections/tunnels between the (R)AN node and the UPFs of the same (PDU) Session. In such a case, in the DL, the (R)AN node merges the traffic from all UPFs belonging to the same Session ID on the single RAB/DRB. In the UL, however, the (R)AN node needs to decide which packet to route over which NG3 tunnel. In order to make the decision, the parameters listed above contain the parameter "traffic/flow filter rules" in order to configuring the UL routing table in the (R)AN node.

It is also possible that the (R)AN node establishes a RAB/DRB per NG3 tunnel within the same (PDU) Session. In such a case, the mapping between the RAB/DRB and the NG3 tunnel can be 1-to-1. Since the mapping is "1-to-1", the (R)AN node does not need to know "traffic/flow filter rules".

To summarize, the SMF may or may not generate and include the session parameter "traffic/flow filter rules" towards the (R)AN node, depending on the network configuration or the session configuration or the RAN capability.

Please also note that the grouping of session parameters per UPF can be also sent from the SMF1 26 to the UE 20 during the session establishment procedure (e.g. during step (8) in FIG. 7), however not including the UPF ID(s), as the UE 20 may not need to know the UPF's IP address or tunnel IDs. The SMF1 26 may decide to send the session context parameters in a "per UPF grouped manner" in case that the network (the RAN and/or the CN) has decided to establish a RAB/DRB per NG3 tunnel. In such a case the UE 20 maintains a kind of tree-structure if session management context parameters, meaning to a PDU session, might be multiple sets of session context parameters which can be compared to multiple bearer context for a single PDN connection in the 4G LTE/EPC system.

Please note that for the same PDU session, the SMF1 26 generates different sets of session context parameters to the (R)AN node 22 (e.g. in step (7) in FIG. 7) and to the UE 20 (e.g. in step (8) in FIG. 7). The session context parameters are different, as the purposes to be reached in the UE 20 and in the (R)AN node 22 are different.

NOTE 3: SMF1 26 as coordination point for Flow based QoS architecture

In the so called Flow based QoS architecture, there can be multiple QoS flows within the same PDU session and possibly within the same RAB/DRB (the assumption is that a single RAB/DRB and a single NG3 connection/tunnel carries multiple QoS flows). Basically, the NG CN requests the (R)AN to carry different QoS flows within the same PDU session and possibly over the same DRB. If such a QoS architecture is deployed, this document proposes to use the SMF1 26 as the coordination point/entity between the UPF 28/29 in the CN and the (R)AN. The SMF1 26 creates the QoS marking rules towards the UPF(s) and the SMF1 26 also creates the corresponding session information and signals it towards the (R)AN node 22.

In particular, taking for example the FIG. 7, in step (6), the SMF1 26 provides the QoS marking rules to the UPF(s) over the NG4 interface. Then, in step (7) in FIG. 7, the SMF1 26 provides information (e.g. with the session parameters) to the (R)AN node 22 over the NG2 interface how to manage the QoS marking of the data packets coming over the NG3 tunnel from the UPF(s).

Figure 8:
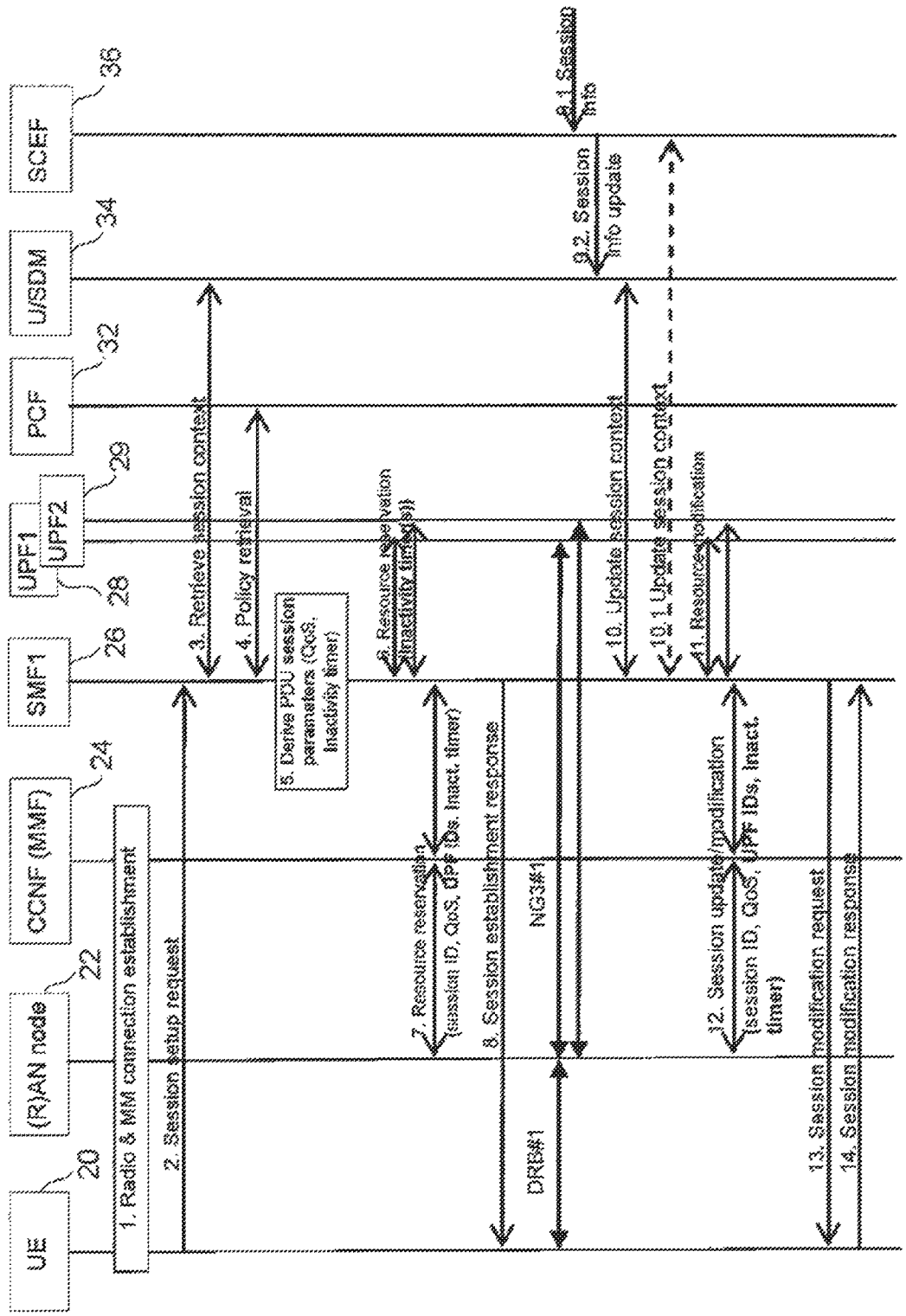
FIG. 8 is a diagram for illustrating call flow for the session parameters modification procedure during the UE is in MM active state.

FIG. 8 shows a session establishment procedure where session parameter modification can be performed while the UE 20 is in the MM Connected/Active state, e.g. if the session parameters modification is based on indication from a 3GPP external application server (SCS/AS) over the service capability exposure function (SCEF) 36.

The steps from FIG. 8 are described in detail as follows:
Step (1) to step (8) are the same as in FIG. 7.
Step (9): Similar to step (0) from FIG. 7.

Step (10): If the UE (session) context in the U/SDM 34 is updated and the U/SDM 34 has an active association with a SMF1 26 for this (session) context, the U/SDM 34 initiates an Update session context procedure towards the SMF1 26. In this procedure the U/SDM 34 sends the updated session parameters to the SMF1 26.

Alternatively, it is possible that the SCEF 36 has an association with the SMF1 26. This is shown as alternative step 10.1 in FIG. 8. In such a case, the SCEF 36 can perform the Update session context procedure directly with the SMF1 26. The U/SDM 34 may or may not be updated. In case that the U/SDM 34 is not updated as part of an alternative step 10.1, then the SMF1 26 may send the recent session parameters to the U/SDM 34 during the PDU session release procedure.

Step (11): If the session parameters in the SMF1 26 has been updated while the SMF1 26 is in the Active SM state (meaning that the UE 20 is in the MM Connected/Active state), the SMF1 26 performs a resource modification procedure (alternative name for the procedure can be a Session modification procedure). During the Session modification procedure, the SMF1 26 sends the new session parameters to the UPF entity(s) 28/29.

Step (12): The SMF1 26 performs a Session update procedure (alternative name for the procedure can be a Session modification procedure) towards the (R)AN node 22. During the Session update procedure the SMF1 26 sends the new session parameters to the (R)AN node 22, as the signaling path can pass the CCNF 24 (e.g. the MMF).

Step (13): The SMF1 26 sends a Session modification request message towards the UE 20. This message can be considered as a NAS SM message. The SMF1 26 informs the UE 20 about the modified session parameters for the uplink transmission.

Step (14): The UE 20 replies with a Session modification response message towards the SMF1 26. This message can be considered as a NAS SM message.

FIG. 7 and FIG. 8 show the session parameters maintenance and exchange in case of the PDU session establishment procedure (FIG. 7) and the session modification procedure (FIG. 8). However, it is possible to generate session parameters during other procedure, e.g. during session activation (i.e. UP connection activation) as shown in FIG. 9.

Figure 9:
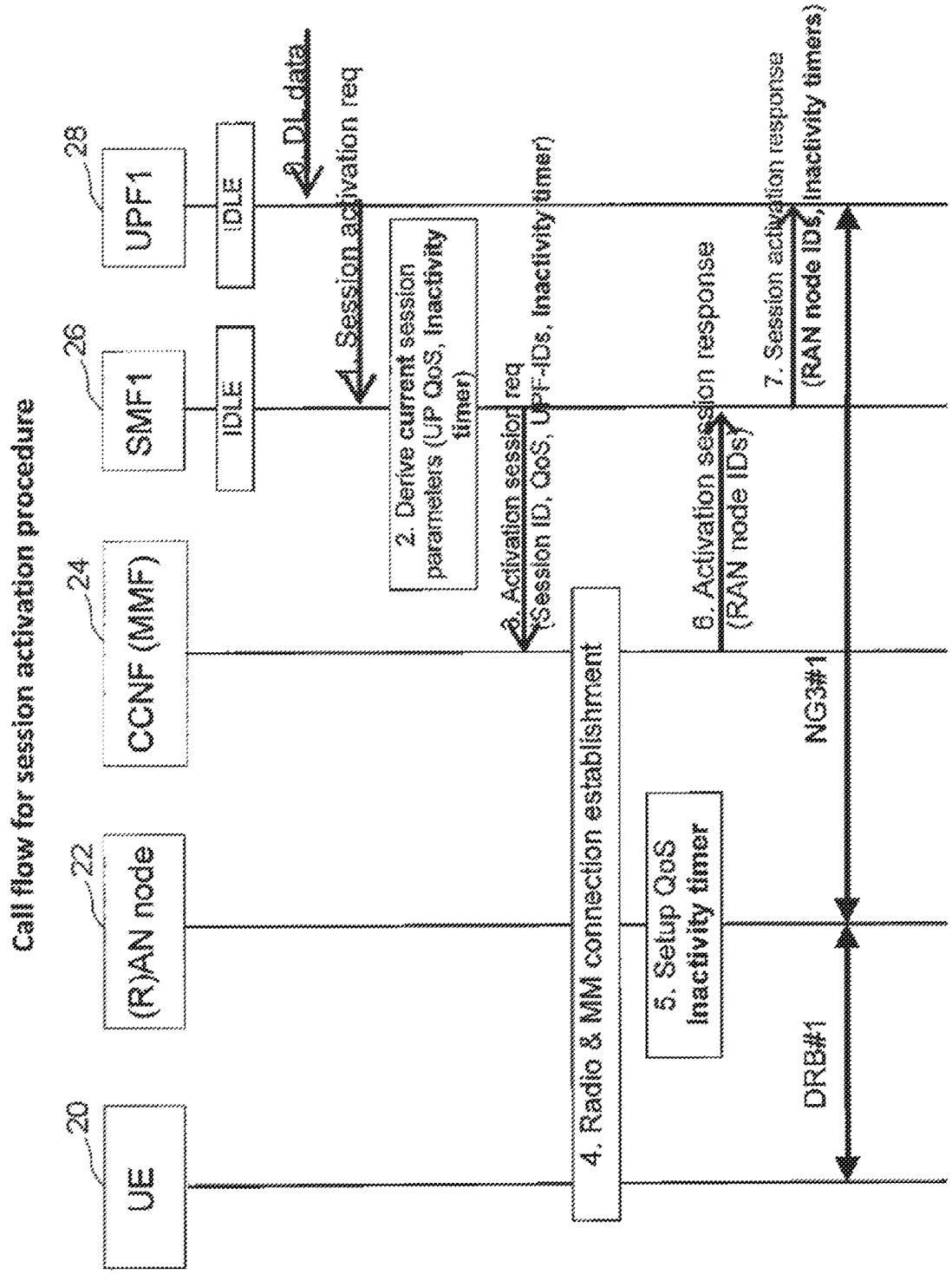
FIG. 9 is a diagram for illustrating call flow for the session activation procedure.

The steps from FIG. 9 are described in detail as follows:
Step (0): DL data arrives at the UPF1 28. It is assumed that the SM state for this PDU session is Idle, so that the UPF1 28 cannot transmit the DL packet.

Step (1): The UPF1 28 initiates a Session activation procedure towards the associated SMF1 26.

Step (2): The SMF1 26 may already maintain session parameters derived during the PDU session establishment as described in step (5) in FIG. 7, however, it is possible that some conditions might have changed and the SMF1 26 may determine new session parameters. Such new determination of session parameters can be based on the current day/week time and the availability of communication pattern.

Step (3): The SMF1 26 performs an Activation session procedure, which can be similar to the resource reservation procedure from step (7) in FIG. 7.

Step (4): Depending on the MM state of the UE 20 (e.g. the UE 20 can be in the Idle or in the Connected state), the MMF 24 performs different procedures. For example, if the MM state is connected, as the NAS signaling connection and the NG2 signaling connection exist, the MMF 24 forwards the SMF's request further to the (R)AN node 22. Otherwise, if the UE 20 is in the MM Idle state, the MMF 24 needs first to page the UE 20 and later to setup the UE context to the (R)AN node 22.

Step (5): After the (R)AN node 22 receives the updated UE context parameters, which can be in the form of the session parameters sent from the SMF1 26, the (R)AN node 22 establishes the new radio access connection (e.g. the radio access bearer) and updates its RAN parameters. Possible update of the RAN parameters is described in solution 2.

Step (6): The MMF 24 replies to step (3) with a Session activation response message which is a response to step (3). This message contains the RAN node UP identifiers (an IP address, tunnel endpoint identifiers, etc.).

Step (7): In case of the successful response in step (6), i.e. successful session activation in the (R)AN node 22, the SMF1 26 sends a Session Activation response message to the UPF1 28 including session parameters like QoS rules, charging rules, RAN UP IDs, etc. The session parameters may include among others one or multiple Inactivity timer types which is used to determine the inactivity of a session as whole or to deactivate the UP connection merely (as described in NOTE 2 above). In some point of time, when the Inactivity timer expires, the UPF1 28 can trigger a session deactivation request towards the SMF1 26. Please note that the session deactivation request in not shown in FIG. 9.

If the indication in step (6) was not successful, the SMF1 26 sends a Session Activation response message to the UPF1 28 including a corresponding failure cause.

In case that multiple UPFs 28/29 are configured per PDU session, as already explained, the SMF1 26 can generate and install different session parameters to the different UPFs. The different session parameters can include different Inactivity timers. However, if a common (radio) access bearer is used in the (R)AN system, then even if one UPF would trigger the Session deactivation request towards the SMF1 26, the SMF1 26 should not deactivate the UP connection, as the data flows over the other(s) UPF continue to use the connection.

Solution 2

One particular aspect which deserves a special attention is the indication of CN-assisted (R)AN parameters. Similar to the LTE/EPC, the NG CN can indicate (R)AN-related parameters to be taken into account by the (R)AN for optimizing the UE power consumptions or for reducing the RAN-CN signaling. In the NG CN, such indication from the NG CN towards the NG (R)AN can be called e.g. "CN-assisted (R)AN parameters". The "CN-assisted (R)AN parameters" can contain UE-related (R)AN parameters or Session-related (R)AN parameters. Also, "CN-assisted (R)AN parameters" can be determined and sourced from the MMF or from the SMF. The difference to the LTE/EPC system is that in the NG system the "CN-assisted (R)AN parameters" are stored in multiple network functions, whereas in the LTE/EPC they are maintained merely in the MME. Therefore in the NG system coordination and new procedures for the maintenance of the "CN-assisted (R)AN parameters" are needed.

This document proposes several variants how the session parameters maintained in the SMF1 26 as shown in FIG. 7 and FIG. 8 can be used as "CN-assisted (R)AN parameters":

(a) The SMF1 26 generates and sends a particular IE containing the "CN-assisted (R)AN parameters" for a particular PDU session. The RAN node 22 can determine the RAN parameters depending on all activated PDU sessions and available "CN-assisted (R)AN parameters" for other PDU sessions.

(b) The SMF1 26 sends session parameters towards the (R)AN node 22 as shown e.g. in step (7) in FIG. 7. The MMF 24 processes some of those session parameters and determines the "CN-assisted (R)AN parameters" to be signaled to the (R)AN node 22. In this case, the MMF 24 is the main entity gathering and generating "CN-assisted (R)AN parameters".

One specific parameter of the "CN-assisted (R)AN parameters" set can be a parameter used for the transition from the MM Active to the MM Idle state. Such a parameter can be a UE Inactivity timer. Another parameter can be a UP Session Inactivity timer. It is assumed that the UP Session Inactivity timer is part of the session parameters maintained by the SMF1 26, whereas the UE Inactivity timer can be maintained in the (R)AN node 22 (or optionally by the MMF 24) as part of mobility management context for the UE 20 as a whole, e.g. according to alternatives (a) or (b) above.

In case of session deactivation when multiple activated PDU sessions are existing, the (R)AN node 22 can either 1) maintain an Inactivity timer per session (called UP Session Inactivity timer) and start a session deactivation procedure after this timer expires, or 2) maintain a single Inactivity timer per UE (called UE Inactivity timer). In the latter case, the (R)AN node 22 needs to align the value of the UE Inactivity timer with the values of the multiple Session Inactivity timer. For example, the UE Inactivity timer obtains the value of the largest Session Inactivity timer value. A different logic in the RAN node 22 can be also used to derive the value of the UE Inactivity timer based on the UP Session Inactivity timers.

Alternatively, the alignment of the Session Inactivity timer values may be performed by the CCNF 24 (e.g. the MMF). In this case it is required that the MMF 24 terminates the signaling from the SMFs and can process the received session parameters like a Session Inactivity timer. The MMF 24 can select a value for the UE Inactivity timer and signal it to the (R)AN node 22 within CN-assisted RAN parameters informational element.

Yet another aspect of the CN-assisted (R)AN parameters is the availability of the new RAN mobility state called e.g. "RAN Inactive state". It is assumed that such a "RAN Inactive state" is managed by the (R)AN itself and it is transparent to the NG CN. From the NG CN perspective, the UE 20 would be in the MM Active/Connected state, and the transitions between the RAN Active and RAN Inactive states would not involve any explicit signaling or awareness of the NG CN. This document further proposes that the NG CN can assist the RAN with information for the RAN Active and RAN Inactive states transitions. In this case, the CN-assisted (R)AN parameters contain parameters to be applied for the transition for the RAN Active or the RAN Inactive states. For example, the CN-assisted (R)AN parameters can contain an additional Inactivity timer, e.g. called a "RAN Inactive state timer" or a "RAN Dormant timer", which is used by the (R)AN node to derive a time point to transit from the RAN Active to RAN Dormant/Inactive state. With other words, the NG CN, e.g. the MMF 24, can indicate to the (R)AN node a "RAN Dormant timer" value. Such a timer value can be determined by the MMF 24 based on UE subscription information, but also on currently activated PDU sessions and considering their characteristics.

Solution 3

Another particular aspect of this document is the activation of the PDU sessions in case of multiple existing PDU sessions. Depending on the UE capabilities, subscription information and/or other policies in the network, the feature of independent activation of the PDU session may be omitted for certain UEs or in certain cases. In such a case, when a particular SMF initiates the activation of a PDU session (i.e. UP connection activation), a new procedure is proposed where the network (e.g. the MMF) assures that all existing PDU sessions are activated. In a particular example, it is proposed that the MMF triggers a session activation procedure towards the existing configured SMFs serving PDU sessions other than the PDU where currently UL/DL is to be transmitted.

Figure 10:
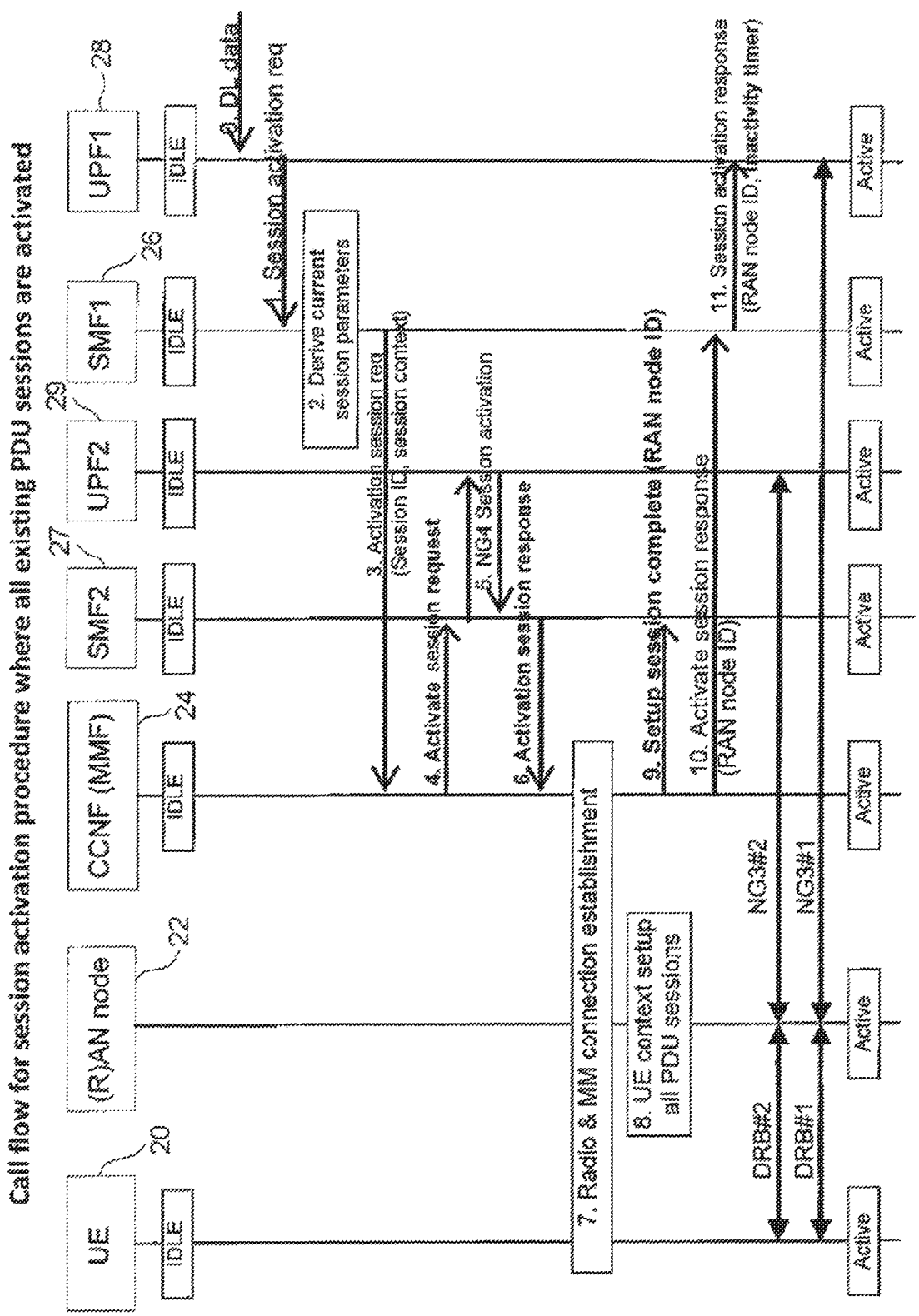
FIG. 10 is a diagram for illustrating call flow for the session activation procedure where all existing PDU sessions are activated.

More details for the case of DL data transmission are shown in FIG. 10.

The steps in FIG. 10 are described in detail as follows:

Step (0) to Step (3) are the same as in FIG. 9.

Step (4): Depending on the MM state of the UE 20 in the MMF 24 (e.g. the UE 20 can be in the Idle or in the Connected state), the MMF 24 performs different procedures. For example, if the MM state is the connected state, as the NAS signaling connection and the NG2 signaling connection exist, the MMF 24 forwards the SMF's request further to the (R)AN node 22.

Otherwise if the UE 20 is in the MM Idle state (the case depicted in FIG. 10), the MMF 24 first checks the internal settings (e.g. UE capabilities) for the particular UE. This is related to the new indication from the UE in step (1) in FIG. 7 exemplary called "individual SM activation". If the CCNF 24 (e.g. the MMF), based on the UE's "individual SM activation" indication (has indicated "non-support"), is configured to activate all PDU sessions, the MMF 24 sends an Activate session request to all existing (configured) SMFs for this UE 20. The CCNF 24 (e.g. the MMF) maintains and stores all configured SMFs (and corresponding addresses and IDs) in the UE's MM context. In the particular case of FIG. 10, the MMF 24 performs the Activate session procedure towards the SMF2 27.

Step (5): The SMF2 27 activates the session with the UPF2 29 by sending (in needed) new session parameters over NG4 interface.

Step (6): After the SMF2 27 has contacted the UPF2 29, the SMF2 27 replies step (4) by sending an Activation session response. The SMF2 27 sends the session context parameters for PDU session 2 towards the (R)AN node 22.

Step (7): If the UE's MM state is Idle (as assumed in this particular example of FIG. 10), the MMF 24 first pages the UE 20 and later to setup the UE context to the (R)AN node 22.

Step (8): After the (R)AN node 22 receives the updated UE context parameters, which can be in the form of the session parameters sent from the SMF, the (R)AN node 22 establishes the new radio access connection (e.g. the radio access bearer) and updates its RAN parameters. Possible update of the RAN parameters is described in solution 2.

After the (R)AN node 22 successfully establishes the radio connection(s), the (R)AN node 22 informs the CCNF 24 (e.g. the MMF) about the success (or failure) and in addition informs the MMF 24 about the RAN node UP identifiers (an IP address, tunnel endpoint identifiers for each NG3 tunnel, etc.).

Step (9): The MMF 24 completes the session activation to the PDU session 2. For example the MMF 24 sends a Session setup complete message to the SMF2 27 containing at least one or multiple of the following parameters: a UE ID, a session ID, RAN node UP identifiers (an IP address, tunnel endpoint identifiers for each NG3 tunnel, etc.).

Step (10): The CCNF 24 (e.g. the MMF) replies to step (3) by sending an Activate session response message to the SMF1 26. This message contains at least one or multiple of the following parameters: a UE ID, a session ID, RAN node UP identifiers (an IP address, tunnel endpoint identifiers for each NG3 tunnel, etc.).

Step (11): The SMF1 26 completes the session activation procedure initiated by the UPF1 28 in step (1). The SMF1 26 sends e.g. a Session Activation response message. This message contains at least one or multiple of the following parameters: a UE ID, a session ID, RAN node UP identifiers (an IP address, tunnel endpoint identifiers for each NG3 tunnel, etc.), one or more session context parameters.

After the above procedures are successfully performed, the UP connections (including a radio connection/bearer and a NG3 tunnel) for the session # and the session #2 are established.

Similar procedure is applied to the scenario, where the UE 20 performs a Service Request procedure to send UL data. In this case, when the MMF 24 obtains the NAS MM signaling from the UE 20, the MMF 24 initiates the session activation procedure towards all existing (configured) SMFs, instead of initiating the procedure to the SMF serving the PDU session, to which the UE 20 is about to send data.

SUMMARY

Beneficially, the above described exemplary embodiments include, although they are not limited to, one or more of the following functionalities:

1) A SMF is a dynamic repository for session parameters/context for existing PDU session. Coordination between the SMF, the UE, the MMF and the (R)AN node are needed to install the session parameters in the user plane functional entities.

a. The SMF derives and configures multiple types of Inactivity timers in the UPF having different meanings.

b. The SMF serves as coordination point for Flow based QoS architecture, namely the SMF installs the QoS marking rules to the user plane function/gateway and signals to the (R)AN node via control plane signaling (e.g. NG2) the rules how to process the QoS marked packets.

2) In case of multiple UPFs per PDU session, different sets of session parameters are determined per UPF and maintained at the SMF.

3) The CN-assisted RAN parameters can be generated per PDU session by the SMF. The determination of common RAN parameters based on the multiple session-oriented CN-assisted RAN parameters can be performed either in the (R)AN node or in the MMF.

a. The SMF derives and configures multiple types of Inactivity timers in the (R)AN node having different meanings.

4) [based on solution 3] A procedure triggered by the MMF, where the MMF (based on configuration to activate all existing PDU session simultaneously) triggers all configured SMFs to initiate a session activation procedure.

It can be seen that the above embodiments (e.g. solutions 1 and 2) describe a method for determination and exchange of session parameters, in case that multiple session may be available per UE, the method comprising the steps of:

1) The SMF retrieves session (e.g. DNN/APN-related) subscription or dynamically generated information from the U/SDM, the PCF or the SCEF.

a. In case the SMF obtains information via the SCEF, the SMF and the SCEF discovers each other (in needed) and handshake during session establishment.

2) The SMF derives or update or modifies session parameters (e.g. QoS rules, charging rules, QoS parameters and/or Inactivity timer(s))
   a. The update of session parameters can be performed implicitly, i.e. without retrieval of new information from other CN CP NFs. For example, the SMF may store a communication pattern indicating the different UE behaviour or Application behaviour at various times of the day or week days.
3) The SMF sends currently valid session parameters to the (R)AN node (e.g. via the MMF). The SMF may also install at each session Activation such Session parameters to the UPF during session establishment, or send them to the UPF each time at session/NG3 activation.
   a. Multiple types of Inactivity timer can be derived by the SMF and configured in the (R)AN and/or in the UPF.

It can be seen that the above embodiments (e.g. solution 3) describe a method for activation of PDU session where the mobility management entity is configured to activate all existing PDU session simultaneously, the method comprising the steps of:
1) A SMF initiates the activation of a PDU session;
2) A MMF initiates signaling to the rest of the existing SMFs to activate the other PDU sessions.
3) All other SMFs trigger the procedure of PDU session activation.

Benefits

It can be seen that the above embodiments beneficially provide a number of benefits, including (but not limited to):
   minimized signaling between the RAN and the CN during a session activation procedure; and
   a novel method to activate a single or all PDU sessions based on UE capability (Solution 3).

User Equipment (UE) 20

Figure 11:
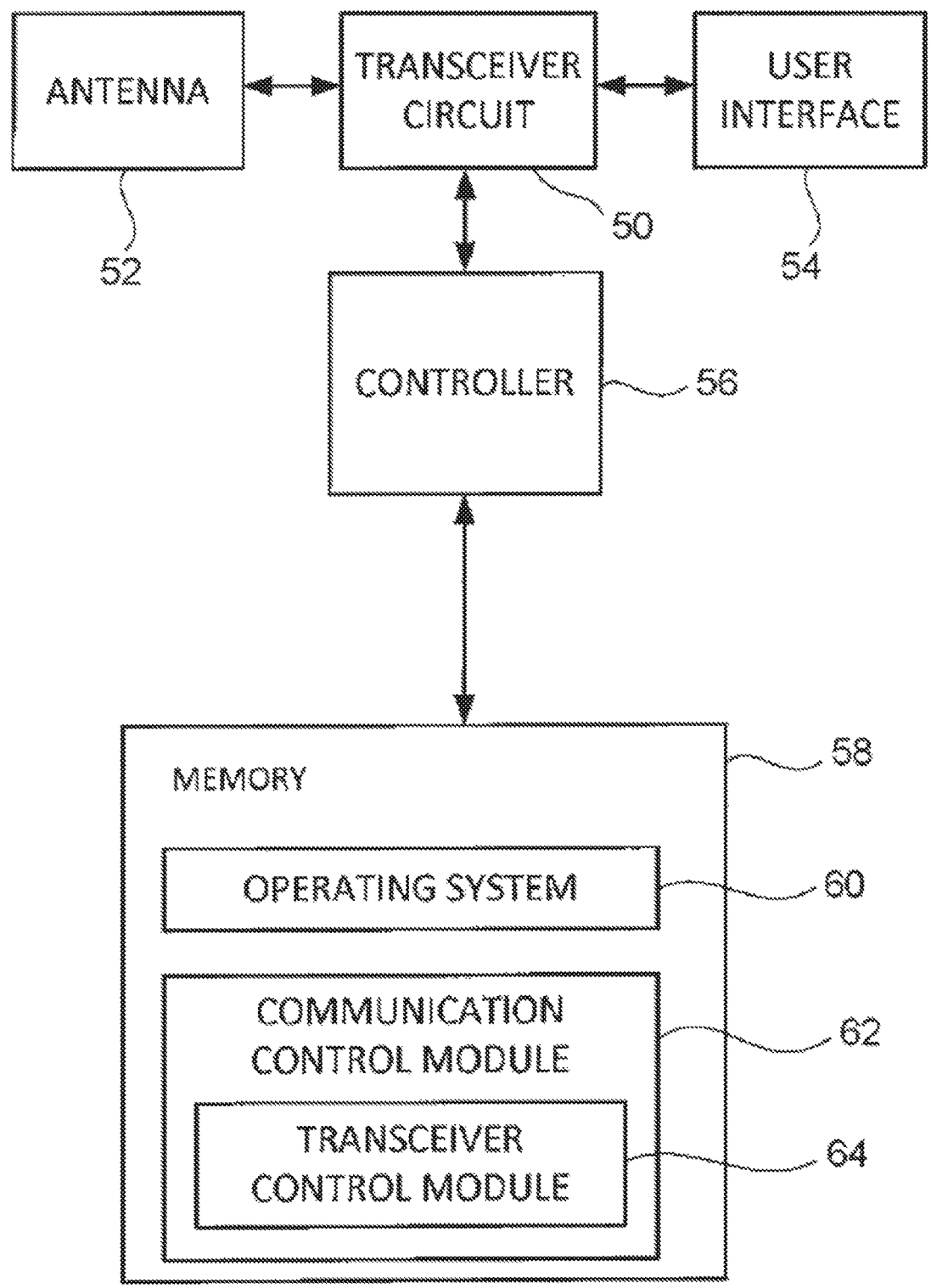
FIG. 11 is a general block diagram of the UE 20.

FIG. 11 is a block diagram illustrating the main components of the UE 20. As shown, the UE 20 includes a transceiver circuit 50 which is operable to transmit signals to and to receive signals from the connected node(s) via one or more antenna 52. Although not necessarily shown in FIG. 11, the UE will of course have all the usual functionality of a conventional mobile device (such as a user interface 54) and this may be provided by any one or any combination of hardware, software and firmware, as appropriate. Software may be pre-installed in the memory 58 and/or may be downloaded via the telecommunication network or from a removable data storage device (RMD), for example. A controller 54 controls the operation of the UE 20 in accordance with software stored in a memory 58. The software includes, among other things, an operating system 60 and a communication control module 62 having at least a transceiver control module 64. The communication control module 62 (using its transceiver control module 64) is responsible for handling (generating/sending/receiving) signaling and uplink/downlink data packets between the UE 20 and other nodes, such as the base station/(R)AN node 22 and the MMF 24. Such signaling may include, for example, appropriately formatted signaling messages relating to radio and MM connection establishment procedures with the network (e.g. a session setup request and associated responses).

MMF 24

Figure 12:
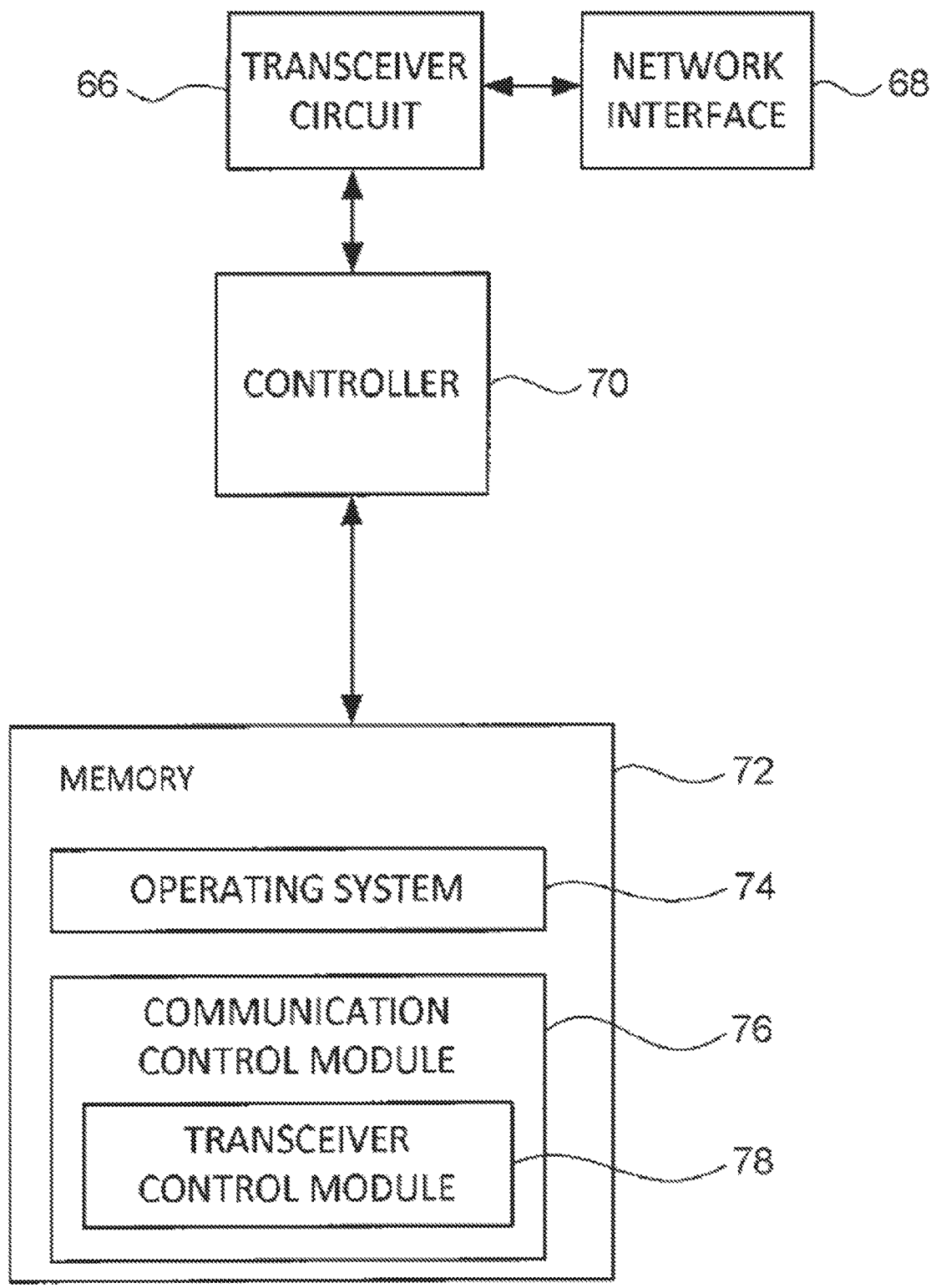
FIG. 12 is a general block diagram for the MMF 24.

FIG. 12 is a block diagram illustrating the main components of the MMF 24. As shown, the MMF 24 includes a transceiver circuit 66 which is operable to transmit signals to and to receive signals from other nodes (including the UE 20) via a network interface 68. A controller 70 controls the operation of the MMF 24 in accordance with software stored in a memory 72. Software may be pre-installed in the memory 72 and/or may be downloaded via the telecommunication network or from a removable data storage device (RMD), for example. The software includes, among other things, an operating system 74 and a communication control module 76 having at least a transceiver control module 78. The communication control module 76 (using its transceiver control module 78) is responsible for handling (generating/sending/receiving) signaling between the MMF 24 and other nodes, such as the UE 20, the base station/(R)AN node 22, and the SMFs 26/27. Such signaling may include, for example, appropriately formatted signaling messages relating to a session establishment/activation/modification procedure (for a particular UE) and/or the like.

SMF 26/27

Figure 13:
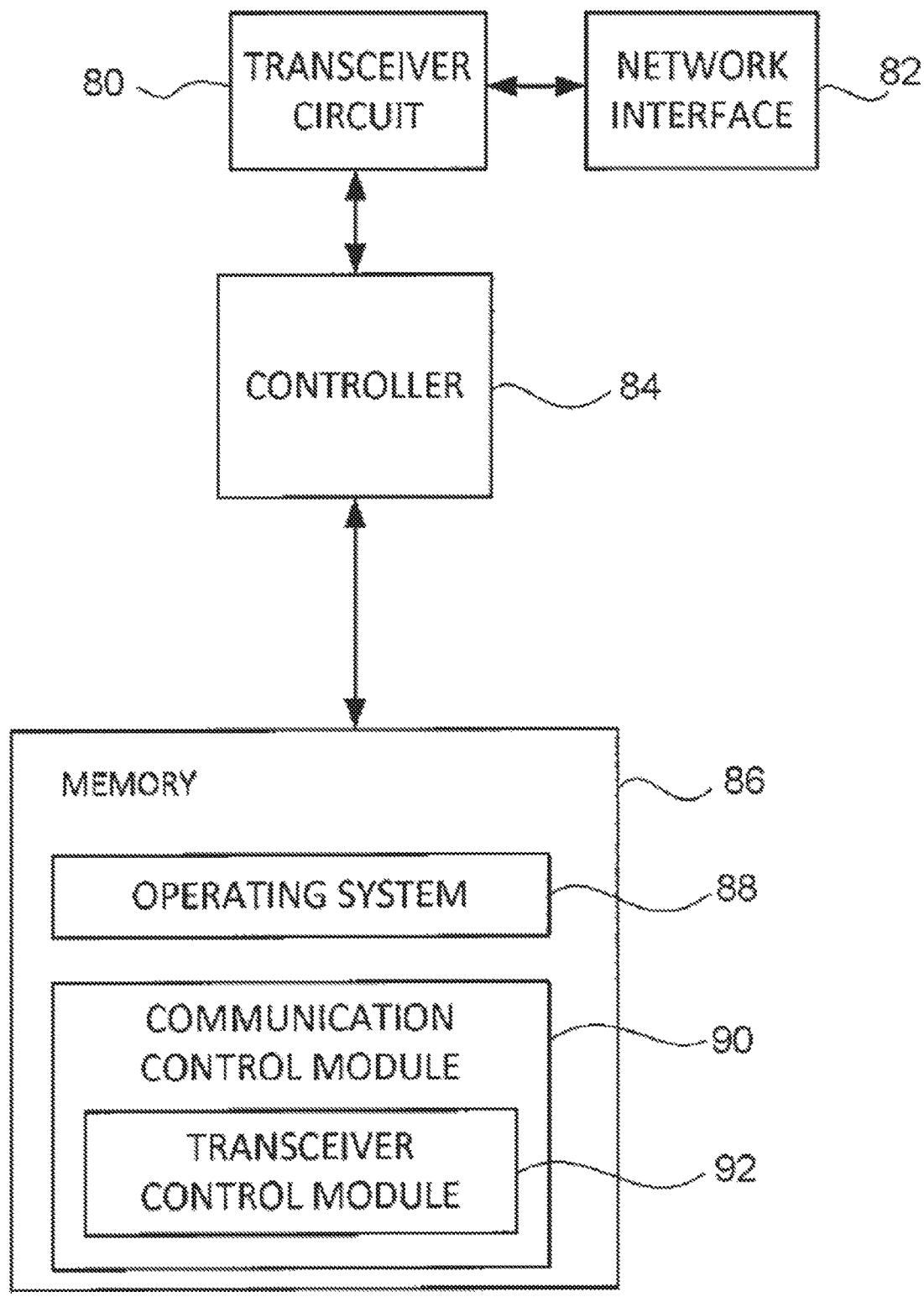
FIG. 13 is a general block diagram for the SMF 26/27.

FIG. 13 is a block diagram illustrating the main components of an exemplary SMF 26/27. As shown, the SMF 26/27 includes a transceiver circuit 80 which is operable to transmit signals to and to receive signals from other nodes connected to the SMF 26/27 (such as the MMF 24) via a network interface 82. A controller 84 controls the operation of the SMF 26/27 in accordance with software stored in a memory 86. Software may be pre-installed in the memory 86 and/or may be downloaded via the telecommunication network or from a removable data storage device (RMD), for example. The software includes, among other things, an operating system 88 and a communication control module 90 having at least a transceiver control module 92. The communication control module 90 (using its transceiver control module 92) is responsible for handling (generating/sending/receiving) signaling between the SMF 26/27 and other network nodes (such as the MMF 24). The signaling may include, for example, appropriately formatted signaling messages relating to a session establishment/activation/modification procedure (for a particular UE 20) and/or the like.

(R)AN Node 22

Figure 14:
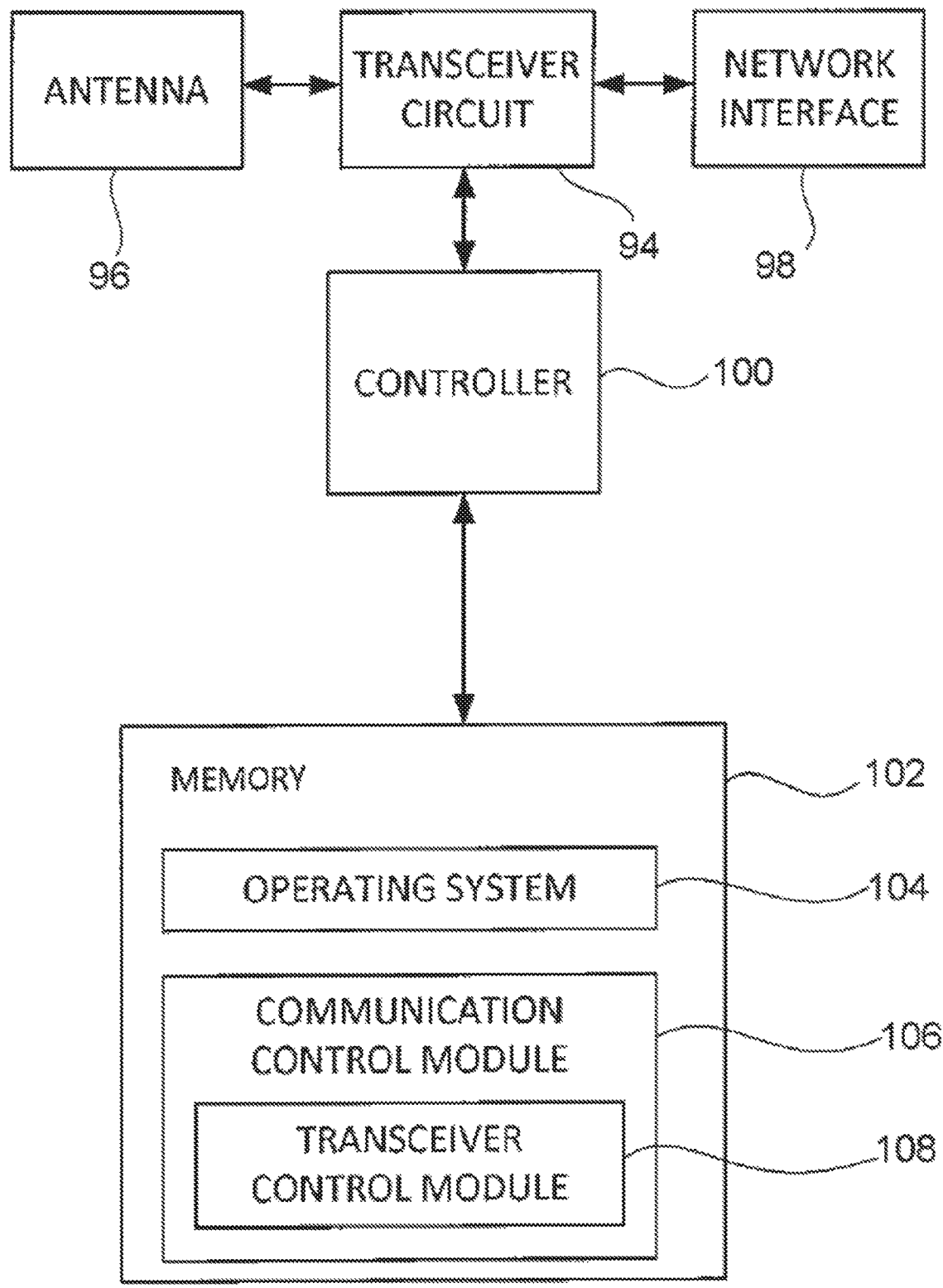
FIG. 14 is a general block diagram for the (R)AN node 22.

FIG. 14 is a block diagram illustrating the main components of an exemplary (R)AN node 22. As shown, the (R)AN node 22 includes a transceiver circuit 94 which is operable to transmit signals to and to receive signals from connected UE(s) 20 via one or more antenna 96 and to transmit signals to and to receive signals from other network nodes (either directly or indirectly) via a network interface 98. A controller 100 controls the operation of the (R)AN node 22 in accordance with software stored in a memory 102. Software may be pre-installed in the memory 102 and/or may be downloaded via the telecommunication network or from a removable data storage device (RMD), for example. The software includes, among other things, an operating system 104 and a communication control module 106 having at least a transceiver control module 108. The communication control module 106 (using its transceiver control module 108) is responsible for handling (generating/sending/receiving) signaling between the (R)AN node 22 and other nodes, such as the UE 20, the MMF 24, and the SMF 26/27 (e.g. indirectly). The signaling may include, for example, appropriately formatted signaling messages relating to a radio and MM connection establishment procedure (for a particular UE 20), a session establishment/activation/modification procedure (for a particular UE 20), and/or the like.

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above description, the UE, the MMF, and the SMF are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the MMF, and the SMF as a signal over a computer network, or on a recording medium. Further, the functionality performed by part or all of this software may be performed using one or more dedicated hardware circuits. However, the use of software modules is preferred as it facilitates the updating of the UE, the MMF, and the SMF in order to update their functionalities.

The above embodiments are also applicable to 'non-mobile' or generally stationary user equipment.

Various other modifications will be apparent to those skilled in the art and will not be described in further detail here.

ABBREVIATIONS AND TERMINOLOGY

The following abbreviations and terminology are used in the current document:

TABLE 1

| | |
|---|---|
| 3GPP | 3rd Generation Partnership Project |
| APN | Access Point Name (used in 2/3/4G as identifier for various PDN connections. In 5G can be similar to data network, DN) |
| AS | Access Stratum (use similar to RRC signaling in this document) |
| CCF | Core Control Functions |
| CCNF | Common Control Network Functions |
| CPF | Control Plane Function |
| NB, eNB | Node B, evolved Node B (but can also be any 'RAN node' implementing 2G, 3G, 4G or future 5G technology) |
| E-UTRAN | Evolved Universal Terrestrial Radio Access Network (also used as EUTRAN) |
| GGSN | Gateway GPRS Support Node |
| GPRS | General Packet Radio Service |
| HPLMN | Home Public Land Mobile Network |
| HSS | Home Subscriber Server |
| IE | Informational Element (used as part of a signalling message) |
| MME | Mobility Management Entity |
| MMF | Mobility Management Function |
| MNO | Mobile Network Operator |
| NAS | Non Access Stratum |
| NG | Next Generation (term used for 5G networks, but may be any other generation of networks) |
| NNSF | NAS/Network Node Selection Function |
| NSI | Network Slice Instances |

TABLE 1-continued

| | |
|---|---|
| PCF | Policy Control Function |
| PCRF | Policy and Charging Rules Function |
| PGW | Packet Data Network Gateway |
| PSM | Power Saving Mode |
| RAB | Radio Access Bearer (used in similar way as Data Radio Bearer, DRB) |
| RAU | Routing Area Update |
| RNC | Radio Network Controller |
| RRC | Radio Resource Control |
| PLMN | Public Land Mobile Network |
| SCNF | Slice-specific Core Network Functions |
| SCS/AS | Service Capability Server/Application Server |
| SMF | Session Management Function |
| SGSN | Serving GPRS Support Node |
| SGW | Serving Gateway |
| TAU | Tracking Area Update |
| UE | User Equipment |
| UPF | User Plane Function (any UP function used for policy/QoS enforcement, mobility, UE's IP anchor, similar to SGW/PGW in EPC) |
| UTRAN | UMTS Terrestrial Radio Access Network |
| VPLMN | Visited Public Land Mobile Network |

REFERENCES

[1] 3GPP TR 23.799 v1.0.2, 2016 09, "Study on Architecture for Next Generation System"

[2] 3GPP TS 23.401, v14.1.0, 2016 09, "General Packet Radio Service (GPRS) enhancements for Evolved Universal Terrestrial Radio Access Network (E-UTRAN) access"

This application is based upon and claims the benefit of priority from European Patent application No. EP 16193391.6, filed on Oct. 11, 2016, the disclosure of which is incorporated herein in its entirety by reference.

The invention claimed is:

1. A Session Management Function (SMF) node in a mobile communication system including the SMF node and a User Plane Function (UPF) node, the SMF node comprising:
   a memory storing instructions; and
   at least one processor configured to process the instructions to:
      establish a Protocol Data Unit (PDU) session with a User Equipment (UE);
      transmit a message including an inactivity timer to deactivate the PDU session, to the UPF node; and
      receive, from the UPF node, information for initiating session deactivation for the PDU session upon expiration of the inactivity timer in the UPF node.

2. The SMF node according to claim 1, wherein the at least one processor is configured to process the instructions to receive, from a Data Management node, a message including session parameters.

3. A User Plane Function node in a mobile communication system including the UPF node and a Session Management Function (SMF) node, the UPF node comprising:
   a memory storing instructions; and
   at least one processor configured to process the instructions to:
      receive a message including an inactivity timer to deactivate a Protocol Data Unit (PDU) session between a User Equipment (UE) and the SMF node, from the SMF node;
      detect inactivity of user data transfer for the PDU session, for a period based on the inactivity timer; and transmit, to the SMF node, information for initiating, by the SMF node, session deactivation for the PDU session, upon expiration of the inactivity timer in the UPF node.

4. The UPF node according to claim 3, wherein the at least one processor is configured to process the instructions to detect inactivity of the user data transfer for the PDU session for the period upon expiration of the inactivity timer.

5. A mobile communication system comprising:
a Session Management Function (SMF) node configured to:
  establish a Protocol Data Unit (PDU) session with a User Equipment (UE);
  transmit a message including an inactivity timer to deactivate the PDU session, to a User Plane Function (UPF) node; and
  receive, from the UPF node, information for initiating session deactivation for the PDU session upon expiration of the inactivity timer in the UPF node, and the UPF node that is configured to:
  receive the message including the inactivity timer to deactivate the PDU session, from the SMF node;
  detect inactivity of user data transfer for the PDU session, for a period based on the inactivity timer; and
  transmit, to the SMF node, information for initiating, by the SMF node, session deactivation for the PDU session, upon expiration of the inactivity timer in the UPF node.

6. A method of a Session Management Function (SMF) node in a mobile communication system including the SMF node and a User Plane Function (UPF) node, the method comprising:

establishing a Protocol Data Unit (PDU) session with a User Equipment (UE);
transmitting a message including an inactivity timer to deactivate the PDU session, to the UPF node; and
receiving, from the UPF node, information for initiating session deactivation for the PDU session upon expiration of the in activity timer in the UPF node.

7. The method according to claim 6, further comprising receiving, from a Data Management node, a message including session parameters.

8. A method of a User Plane Function (UPF) node in a mobile communication system including the UPF node and a Session Management Function (SMF) node, the method comprising:
  receiving a message including an inactivity timer to deactivate a Protocol Data Unit (PDU) session between a User Equipment (UE) and the SMF node, from the SMF node;
  detecting inactivity of user data transfer for the PDU session, for a period based on the inactivity timer; and
  transmitting, to the SMF node, information for initiating, by the SMF node, session deactivation of the PDU session, upon expiration of the inactivity timer in the UPF node.

9. The method according to claim 8, wherein the detecting inactivity of the user data transfer for the PDU session for the period is performed upon expiration of the inactivity timer.

* * * * *